(12) United States Patent
Ikemoto et al.

(10) Patent No.: US 10,616,429 B2
(45) Date of Patent: Apr. 7, 2020

(54) POSITION DETECTING DEVICE, IMAGE FORMING APPARATUS, AND POSITION DETECTING METHOD

(71) Applicants: Ryohma Ikemoto, Kanagawa (JP); Masamoto Nakazawa, Kanagawa (JP); Daisuke Nikaku, Kanagawa (JP)

(72) Inventors: Ryohma Ikemoto, Kanagawa (JP); Masamoto Nakazawa, Kanagawa (JP); Daisuke Nikaku, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/255,872

(22) Filed: Jan. 24, 2019

(65) Prior Publication Data

US 2019/0238702 A1 Aug. 1, 2019

(30) Foreign Application Priority Data

Jan. 26, 2018 (JP) .................................. 2018-012048

(51) Int. Cl.
*H04N 1/04* (2006.01)
*H04N 1/00* (2006.01)
(Continued)

(52) U.S. Cl.
CPC ....... *H04N 1/00761* (2013.01); *G01B 5/0014* (2013.01); *G01B 11/028* (2013.01);
(Continued)

(58) Field of Classification Search
CPC ........... H04N 1/00761; H04N 1/00702; H04N 1/00708; H04N 1/00737; H04N 1/00779; H04N 1/00785
(Continued)

(56) References Cited

U.S. PATENT DOCUMENTS

2007/0188638 A1 8/2007 Nakazawa et al.
2008/0252787 A1 10/2008 Nakazawa et al.
(Continued)

FOREIGN PATENT DOCUMENTS

JP 10-093787 4/1998
JP 2001-007970 1/2001
(Continued)

OTHER PUBLICATIONS

U.S. Appl. No. 16/135,578, filed Sep. 19, 2018, Daisuke Nikaku, et al.

(Continued)

*Primary Examiner* — Douglas Q Tran
(74) *Attorney, Agent, or Firm* — Oblon, McClelland, Maier & Neustadt, L.L.P.

(57) ABSTRACT

A position detecting device includes circuitry. The circuitry is configured to control a reading device to detect, as a first detection result, an outer shape of a processing subject and a position of an image pattern on the processing subject; control the reading device to detect, as a second detection result, a mark arranged on a position reference member, the mark corresponding to a predetermined position in the reading device; and detect a first correction value of the reading device and a second correction value of the reading device corrected by the first correction value on basis of the second detection result and reflect the first correction value and the second correction value to the first detection result to correct a processing position in the processing subject.

14 Claims, 25 Drawing Sheets

(51) Int. Cl.
  *G03G 15/00* (2006.01)
  *G01B 11/26* (2006.01)
  *G01B 11/02* (2006.01)
  *G01B 5/00* (2006.01)
(52) U.S. Cl.
  CPC ......... *G01B 11/26* (2013.01); *G03G 15/5062* (2013.01); *H04N 1/00702* (2013.01); *H04N 1/00708* (2013.01); *H04N 1/00737* (2013.01); *H04N 1/00779* (2013.01); *H04N 1/00785* (2013.01)
(58) Field of Classification Search
  USPC .............................................. 358/1.1, 1, 488
  See application file for complete search history.

(56) References Cited

U.S. PATENT DOCUMENTS

| | | |
|---|---|---|
| 2010/0027061 A1 | 2/2010 | Nakazawa |
| 2010/0171998 A1 | 7/2010 | Nakazawa |
| 2011/0026083 A1 | 2/2011 | Nakazawa |
| 2011/0026085 A1 | 2/2011 | Tsukahara et al. |
| 2011/0051201 A1 | 3/2011 | Hashimoto et al. |
| 2011/0063488 A1 | 3/2011 | Nakazawa |
| 2012/0081715 A1 | 4/2012 | Takano |
| 2012/0224205 A1 | 9/2012 | Nakazawa |
| 2013/0044338 A1 | 2/2013 | Nikaku |
| 2013/0063792 A1 | 3/2013 | Nakazawa |
| 2014/0009767 A1 | 1/2014 | Tanigawa et al. |
| 2014/0029065 A1 | 1/2014 | Nakazawa |
| 2014/0078532 A1 | 3/2014 | Nikaku |
| 2014/0204427 A1 | 7/2014 | Nakazawa |
| 2014/0204432 A1 | 7/2014 | Hashimoto et al. |
| 2014/0211273 A1 | 7/2014 | Konno et al. |
| 2014/0368893 A1 | 12/2014 | Nakazawa et al. |
| 2015/0098117 A1 | 4/2015 | Marumoto et al. |
| 2015/0116794 A1 | 4/2015 | Nakazawa |
| 2015/0163378 A1 | 6/2015 | Konno et al. |
| 2015/0222790 A1 | 8/2015 | Asaba et al. |
| 2015/0286909 A1* | 10/2015 | Yano .................. G06K 15/1242 358/1.17 |
| 2015/0304517 A1 | 10/2015 | Nakazawa et al. |
| 2016/0003673 A1 | 1/2016 | Hashimoto et al. |
| 2016/0006961 A1 | 1/2016 | Asaba et al. |
| 2016/0088179 A1 | 3/2016 | Nakazawa et al. |
| 2016/0112660 A1 | 4/2016 | Nakazawa et al. |
| 2016/0119495 A1 | 4/2016 | Konno et al. |
| 2016/0173719 A1 | 6/2016 | Hashimoto et al. |
| 2016/0255232 A1 | 9/2016 | Ooishi |
| 2016/0268330 A1 | 9/2016 | Nakazawa et al. |
| 2016/0295138 A1 | 10/2016 | Asaba et al. |
| 2016/0373604 A1 | 12/2016 | Hashimoto et al. |
| 2017/0019567 A1 | 1/2017 | Konno et al. |
| 2017/0163836 A1 | 6/2017 | Nakazawa |
| 2017/0170225 A1 | 6/2017 | Asaba et al. |
| 2017/0201700 A1 | 7/2017 | Hashimoto et al. |
| 2017/0295298 A1 | 10/2017 | Ozaki et al. |
| 2017/0302821 A1 | 10/2017 | Sasa et al. |
| 2017/0324883 A1 | 11/2017 | Konno et al. |
| 2018/0146150 A1 | 5/2018 | Shirado et al. |
| 2018/0175096 A1 | 6/2018 | Inoue et al. |
| 2018/0213124 A1 | 7/2018 | Yokohama et al. |
| 2018/0261642 A1 | 9/2018 | Asaba et al. |
| 2019/0171154 A1* | 6/2019 | Kobayashi ......... G03G 15/6558 |

FOREIGN PATENT DOCUMENTS

| | | |
|---|---|---|
| JP | 2002-354207 | 12/2002 |
| JP | 2008-028737 | 2/2008 |
| JP | 2017-107101 A | 6/2017 |
| JP | 2017-139546 | 8/2017 |
| WO | WO2011/108645 A1 | 9/2011 |

OTHER PUBLICATIONS

Extended European Search Report dated May 31, 2019 in European Patent Application No. 19153619.2, 6 pages.

* cited by examiner

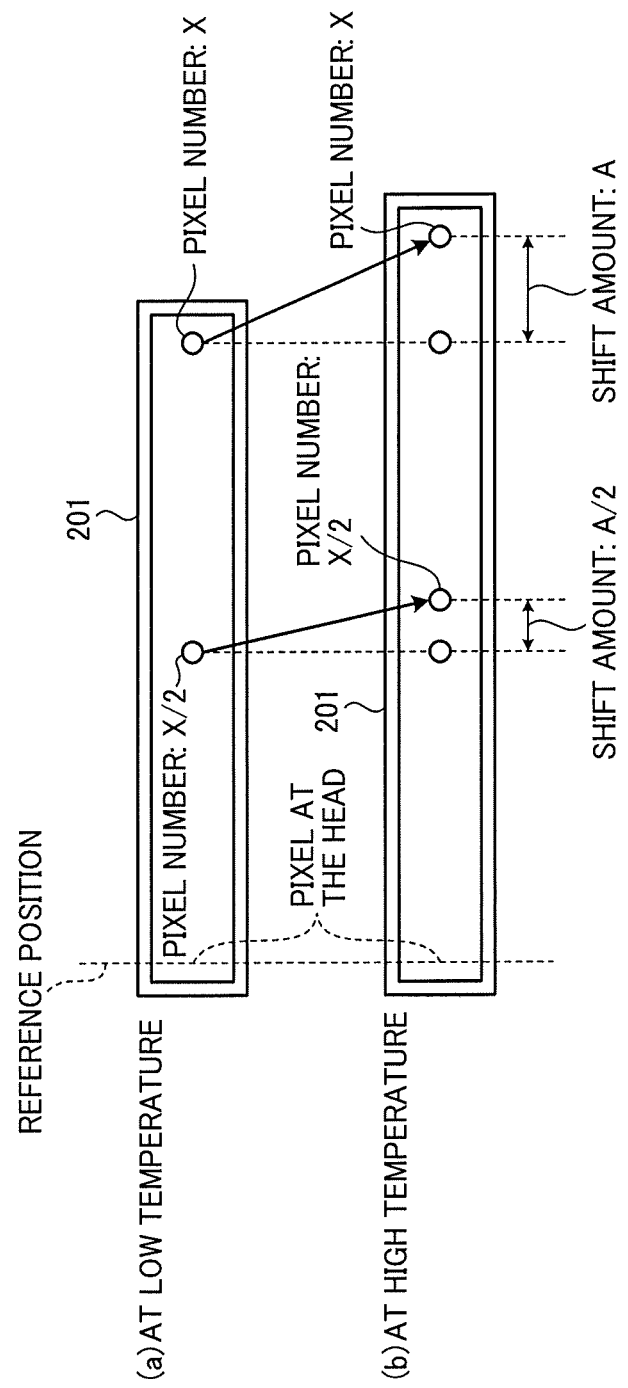

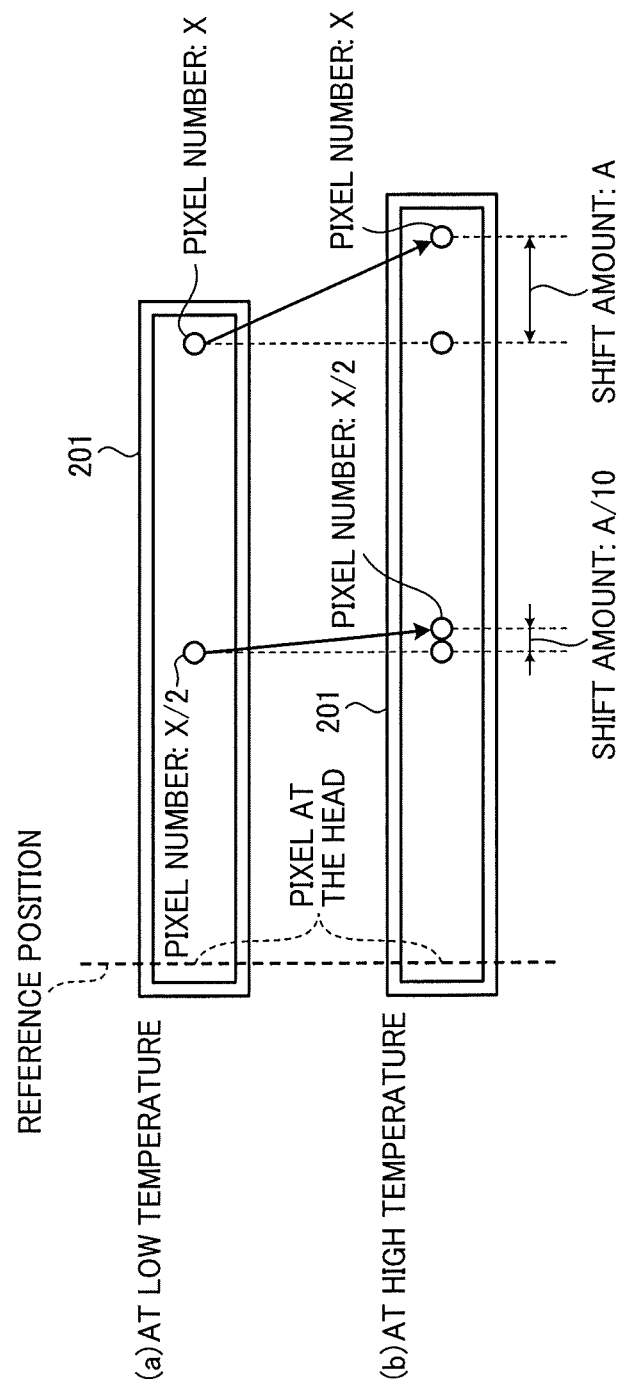

(a) NO WARPING (b) WITH WARPING

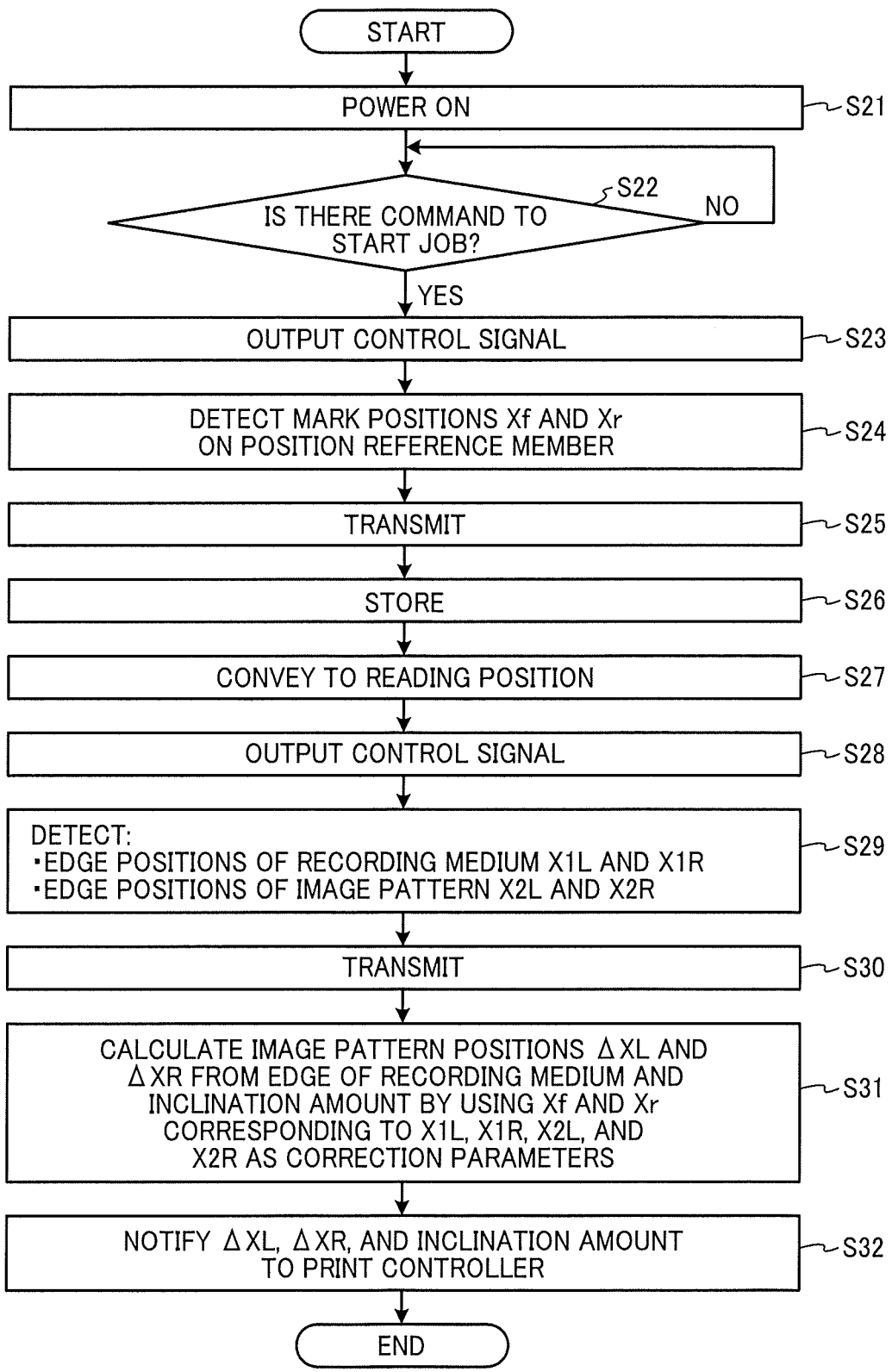

POSITION DETECTING DEVICE, IMAGE FORMING APPARATUS, AND POSITION DETECTING METHOD

CROSS-REFERENCE TO RELATED APPLICATION

This patent application is based on and claims priority pursuant to 35 U.S.C. § 119(a) to Japanese Patent Application No. 2018-012048, filed on Jan. 26, 2018, in the Japan Patent Office, the entire disclosure of which is incorporated by reference herein.

BACKGROUND

Technical Field

Aspects of the present disclosure relate to a position detecting device, an image forming apparatus, and a position detecting method.

Related Art

For the purpose of correcting the conveyance position of a conveyed object and the processing position of the conveyed object, technique is known of reading an outer edge position of the conveyed object and the processing position of the conveyed object by a reading device such as a contact image sensor (CIS).

SUMMARY

According to an aspect of the present disclosure, there is provided a position detecting device including circuitry. The circuitry is configured to control a reading device to detect, as a first detection result, an outer shape of a processing subject and a position of an image pattern on the processing subject; control the reading device to detect, as a second detection result, a mark arranged on a position reference member, the mark corresponding to a predetermined position in the reading device; and detect a first correction value of the reading device and a second correction value of the reading device corrected by the first correction value on basis of the second detection result and reflect the first correction value and the second correction value to the first detection result to correct a processing position in the processing subject.

According to another aspect of the present disclosure, there is provided an image forming apparatus that includes a reading device, a position reference member, a print engine, and the position detecting device. A mark corresponding to a predetermined position in the reading device is arranged on the position reference member. The position detecting device is configured to control conveyance of a recording medium to the print engine and control the print engine on basis of image writing position information notified from the position detecting device to write an image on the recording medium.

According to still another aspect of the present disclosure, there is provided a position detecting method to be executed in a position detecting device. The method includes controlling a reading device to detect, as a first detection result, an outer shape of a processing subject and a position of an image pattern on the processing subject; controlling the reading device to detect, as a second detection result, a mark arranged on a position reference member, the mark corresponding to a predetermined position in the reading device; and detecting a first correction value of the reading device and a second correction value of the reading device corrected by the first correction value on basis of the second detection result and reflect the first correction value and the second correction value to the first detection result to correct a processing position in the processing subject.

According to still yet another aspect of the present disclosure, there is provided a non-transitory recording medium storing computer-readable program code which causes a position detecting device to execute processing. The processing includes controlling a reading device to detect, as a first detection result, an outer shape of a processing subject and a position of an image pattern on the processing subject; controlling the reading device to detect, as a second detection result, a mark arranged on a position reference member, the mark corresponding to a predetermined position in the reading device; and detecting a first correction value of the reading device and a second correction value of the reading device corrected by the first correction value on basis of the second detection result and reflect the first correction value and the second correction value to the first detection result to correct a processing position in the processing subject.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 17-1 is a schematic diagram illustrating a variation of the corresponding positional relationship between the reading device and the position reference member in the medium position detecting device;

FIG. 17-2 is a graph illustrating the expansion amount at each main scanning position;

FIG. 18-1 is a schematic diagram illustrating another variation of the corresponding positional relationship between the reading device and the position reference member in the medium position detecting device;

FIG. 18-2 is a graph illustrating the expansion amount at each main scanning position;

FIG. 29 is a flowchart schematically illustrating a flow of processing of notifying an image writing position according to a sixth embodiment.

Figure 1:
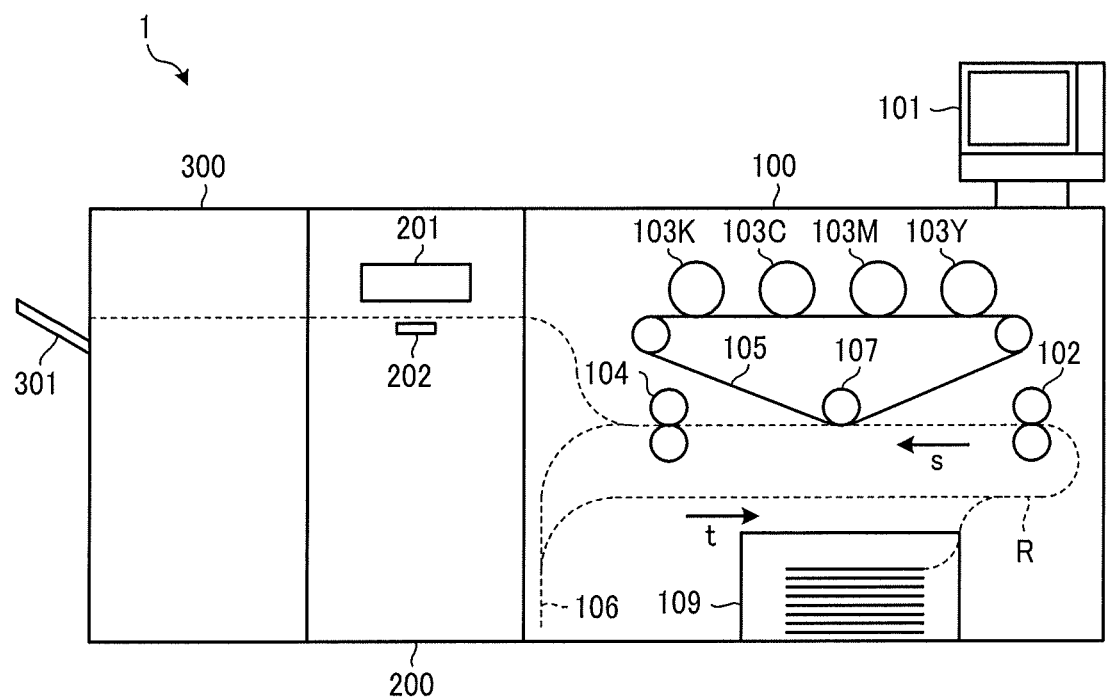
FIG. 1 is a schematic diagram illustrating an example of a hardware configuration of a printing system according to a first embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of a position detecting device, an image forming apparatus, and a position detecting method will be described in detail below with reference to the accompanying drawings. In the following, the case where a position detecting device and an image forming apparatus are applied to a printing system including a printing apparatus such as a commercial printer (production printer) that continuously prints out a large number of sheets in a short period of time is described as an example; however, embodiments of the present disclosure are not limited thereto.

First Embodiment

[Description of Hardware Configuration of Printing System]

FIG. 1 is a schematic diagram illustrating an example of a hardware configuration of a printing system 1 according to a first embodiment. As illustrated in FIG. 1, the printing system 1 that is an image forming apparatus includes a printing apparatus 100, a medium position detecting device 200 (an example of a position detecting device), and a stacker 300.

The printing apparatus 100 includes an operation panel 101, tandem electrophotographic image formers 103Y, 103M, 103C, and 103K, a transfer belt 105, a secondary transfer roller 107, a sheet feeder 109, a pair of conveyance rollers 102, a fixing roller 104, and a reverse path 106.

The operation panel 101 is an operation display that performs various operation inputs to the printing apparatus 100 or the medium position detecting device 200 or displays various screens.

Each of the image formers 103Y, 103M, 103C, and 103K, is formed with a toner image by being subjected to an image forming process (charging process, exposure process, developing process, transfer process, and cleaning process) and transfers the formed toner image to the transfer belt 105. In the present embodiment, a yellow toner image is formed on the image former 103Y, a magenta toner image is formed on the image former 103M, a cyan toner image is formed on the image former 103C, and on the image former 103K, a black toner image is formed; however, embodiments of the present disclosure are not limited thereto.

The transfer belt 105 conveys the toner image (full-color toner image) and transferred from the image formers 103Y, 103M, 103C, and 103K in a superimposed manner to a secondary transfer position on the secondary transfer roller 107. In the present embodiment, it is assumed that the yellow toner image is first transferred to the transfer belt 105, and subsequently, the magenta toner image, the cyan toner image, and the black toner image are sequentially and transferred while superimposed; however, embodiments of the present disclosure are not limited thereto.

The sheet feeder 109 accommodates a plurality of recording media to be processed (conveyed objects) in a stack and feeds the recording media. Examples of recording media include recording paper (transfer paper). However, without being limited thereto, any medium may be used as long as the medium is capable of recording images such as a coated paper, a cardboard, an overhead projector (OHP) sheet, a plastic film, a prepreg, or a copper foil.

The pair of conveyance rollers 102 conveys a recording medium fed by the sheet feeder 109 in the direction indicated by arrow s on a conveyance path R.

The secondary transfer roller 107 collectively transfers the full-color toner image conveyed by the transfer belt 105 onto the recording medium conveyed by the pair of conveyance rollers 102 at the secondary transfer position.

The fixing roller 104 heats up and pressurizes the recording medium transferred with the full-color toner image to fix the full-color toner image to the recording medium.

In the case of one-sided printing, the printing apparatus 100 sends the printed matter, which is the recording medium on which the full-color toner image is fixed, to the medium position detecting device 200. On the other hand, in the case of duplex printing, the printing apparatus 100 sends the recording medium, on which the full-color toner image has been fixed, to the reverse path 106.

The reverse path 106 switches back the fed recording medium to reverse the front and back sides of the recording medium and conveys the recording medium in the direction of arrow t. The recording medium conveyed by the reverse path 106 is re-conveyed by the pair of conveyance rollers 102, transferred with a full-color toner image on a side opposite to the previous time by the secondary transfer roller 107, subjected to fixation by the fixing roller 104, and sent to the medium position detecting device 200 and the stacker 300 as a printed matter.

The medium position detecting device 200 located downstream of the printing apparatus 100 includes a reading device 201 and a position reference member 202.

The reading device 201 can be implemented by, for example, a contact image sensor (CIS) in which a plurality of imaging elements (complementary metal oxide semiconductor (CMOS) image sensors) are arranged in a line shape. The reading device 201 receives reflected light from an object to be read and outputs image signals. Specifically, as reading objects, the reading device 201 reads the conveyance position of a recording medium sent from the printing apparatus 100 and the processing position (printing position) in the recording medium. The reading device 201 also reads the position reference member 202 as a reading object.

Then, the medium position detecting device 200 ejects the recording medium, which has been read, to the stacker 300.

The stacker 300 includes a tray 301. The stacker 300 stacks recording media ejected by the medium position detecting device 200 in the tray 301.

Next, the reading device 201 and the position reference member 202 in the medium position detecting device 200 will be described.

Figure 2:
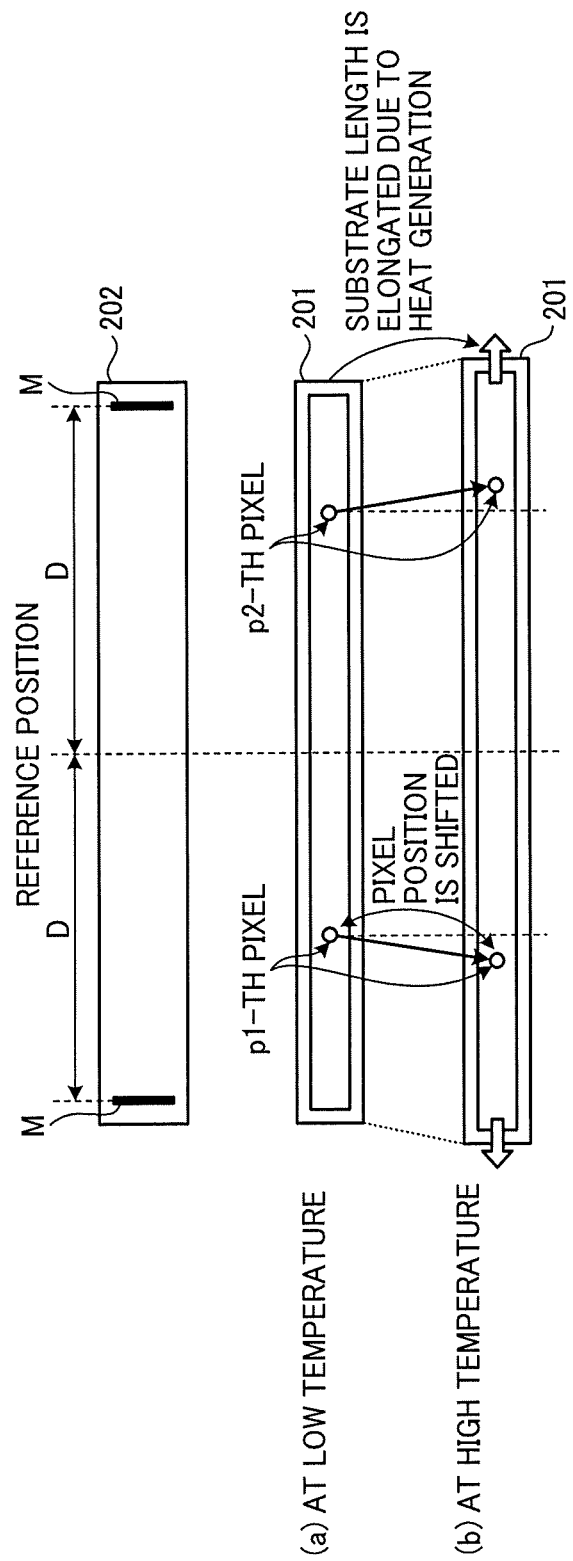
FIG. 2 is a schematic diagram illustrating a corresponding positional relationship between a reading device and a position reference member in a medium position detecting device.

FIG. 2 is a schematic diagram illustrating a corresponding positional relationship between the reading device 201 and the position reference member 202 in the medium position detecting device 200. In FIG. 2 the state of the reading device 201 is illustrated at both (a) low temperature and (b) high temperature. As illustrated in FIG. 2, the position reference member 202 is installed with a position, corresponding to the central pixel which is an imaging element in the center of the reading device 201 in the main scanning direction at a low temperature, as a reference position (support point).

The reading device 201 is also installed with a position, corresponding to the center pixel corresponding to the reference position of the position reference member 202, as a reference position (support point). Note that, in FIG. 2, the position reference member 202, the reading device 201, and the recording medium are two-dimensionally arranged for explanation. In reality, the reading device 201 reads the position reference member 202 and the recording medium at a position facing them.

Meanwhile, in the reading device 201 as illustrated in FIG. 2, the substrate length of the reading device 201 expands in the main scanning direction at a high temperature due to heat generated in the reading device 201 or a rise in the ambient temperature as compared with that at a low temperature. Therefore, the conveyance position of the recording medium and the pixel number of the reading device 201 used for detecting the printing position corresponding to the recording medium at a low temperature become different from those at a high temperature, which results in occurrence of an error in the result of reading the reading device 201.

Specifically, as illustrated in FIG. 2, in the case where the reading device 201 expands to the left and right at a high temperature as compared to that a low temperature (in the example of FIG. 2, the center of the position reference member 202 serves as the reference position), the position of a p1-th pixel (left end of the reading device 201 is set as a 0th pixel) and a p2-th pixel at the low temperature are shifted to the left end and right at the high temperature. That is, it is understood that the physical length from the p1-th pixel to the p2-th pixel at the low temperature does not coincide with the physical length from the p1-th pixel to the p2-th pixel at the high temperature. Note that it is assumed that the shift amount in the sub-scanning position due to expansion and contraction of the reading device 201 is negligibly small as compared to the shift amount in the main scanning position.

Figure 3:
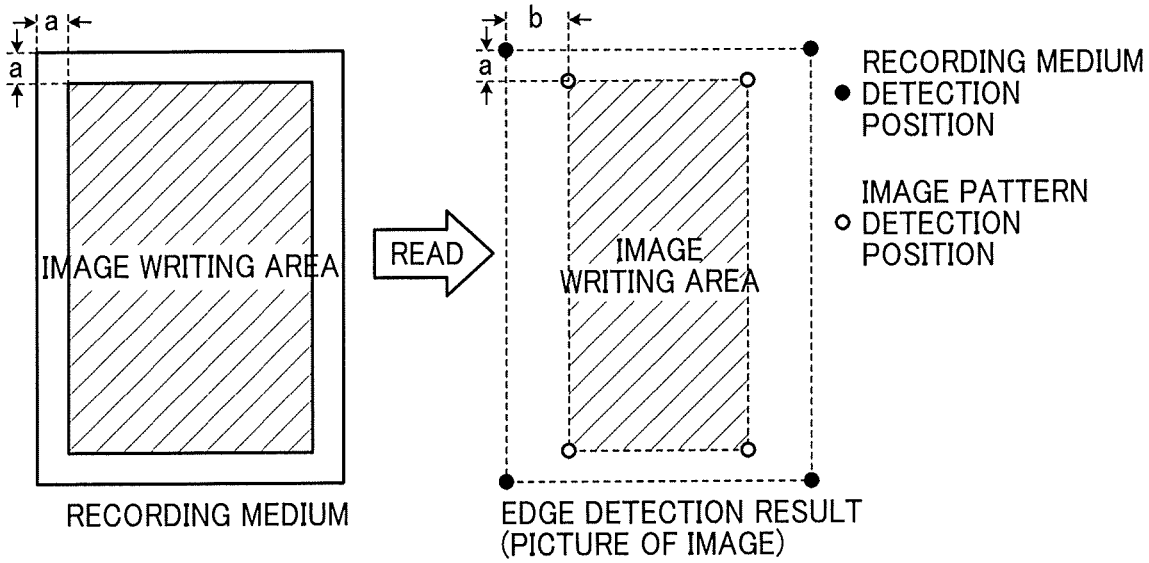
FIG. 3 is a diagram illustrating an example of a position detection result by the expanded reading device.

Here, FIG. 3 is a diagram illustrating an exemplary position detection result by the expanded reading device 201. As illustrated in FIG. 3, in the case where the position of the recording medium in which the length from an edge of the recording medium to an edge of an image pattern coincides in the main scanning direction a and the sub-scanning direction a is detected by the expanded reading device 201, the length from the edge of the recording medium to the edge of the image pattern in the main scanning direction is detected as a different length. In such a case, erroneous image position correction is performed as a result.

Therefore, as illustrated in FIG. 2, in the position reference member 202, a mark M which is a reference line is arranged at the position corresponding to the head pixel which is an imaging element at one end (head) of the reading device 201 in the main scanning direction and at the position corresponding to the tail pixel which is an imaging element at the other end portion (tail) of the reading device 201 in the main scanning direction. Note that although the mark M on the position reference member 202 is a vertical line (first reference mark) parallel to the sub-scanning direction in the present embodiment, any shape may be used as long as the position can be identifiable by the reading device 201 such as a shape other than the vertical line (round shape, etc.). Moreover, the dimension of the interval from the reference position (support point) to the mark M in the position reference member 202 is controlled and is defined as a known value D [mm].

The mark M arranged on the position reference member 202 is arranged at a position where correction of the reading device 201 in the main scanning direction is possible. By assuming expansion and contraction due to a temperature change in the reading device 201 and providing the marks M at appropriate positions in the position reference member 202, it is possible to accurately detect the positions of the end portion of the recording medium and the image pattern regardless of the state of expansion and contraction of the reading device 201.

When the position reference member 202 expands or contracts due to the influence of heat generation or other reasons of peripheral members, the position reference member 202 does not function as an absolute position reference and results in deterioration in the accuracy of position detection. Therefore, the position reference member 202 is made of a material which has a linear expansion coefficient lower than a linear expansion coefficient of the substrate of the reading device 201 and an expansion/contraction amount due to the influence of the ambient temperature being negligibly small in position detection. In the present embodiment, the position reference member 202 is made of glass in consideration of an assumed temperature change range and linear expansion coefficient. Note that the material of the position reference member 202 is not limited thereto, and it is more preferable to use quartz glass or the like in order to implement a highly accurate medium position detection in the case where a temperature change range of the reading device 201 is wide.

As described above, by reading the marks M (vertical lines) which are reference lines on the position reference member 202 by the reading device 201 and calculating the length per pixel from information of the known width (D [mm]) from the reference position to the mark M and the pixel width (including the influence of expansion and contraction) to the position, where the mark M is read, and then reading the positions of the edge of the recording medium and the print pattern, it is possible to accurately detect these positions.

Figure 4:
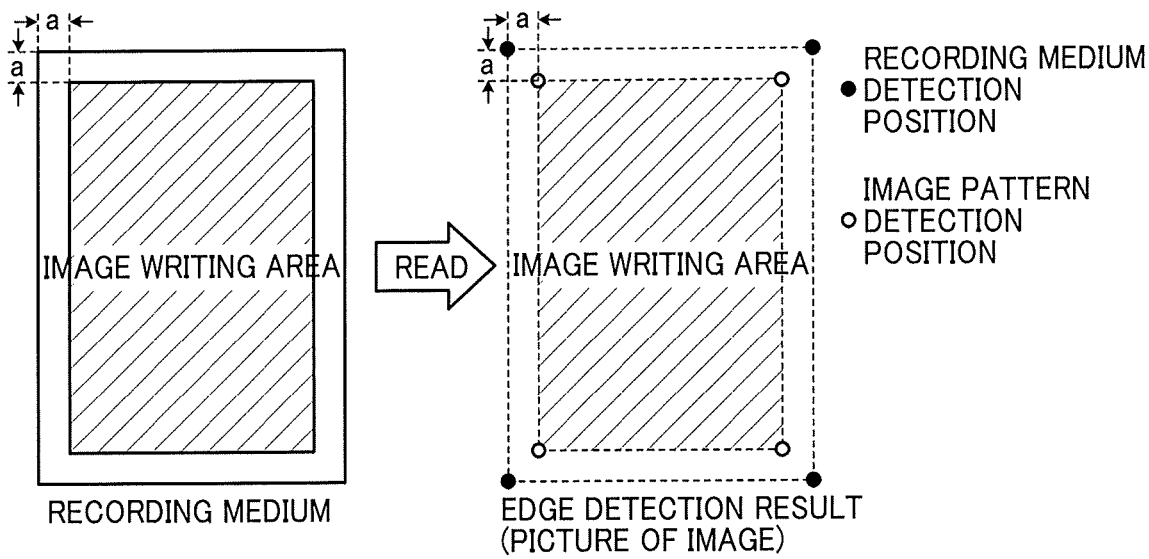
FIG. 4 is a diagram illustrating an example of a position detection result by the reading device after correction using the position reference member.

FIG. 4 is a diagram illustrating an example of a position detection result by the reading device 201 after correction using the position reference member 202. The distance between the edge of the recording medium and the edge of the image pattern can be correctly detected as illustrated in FIG. 4.

Figure 5:
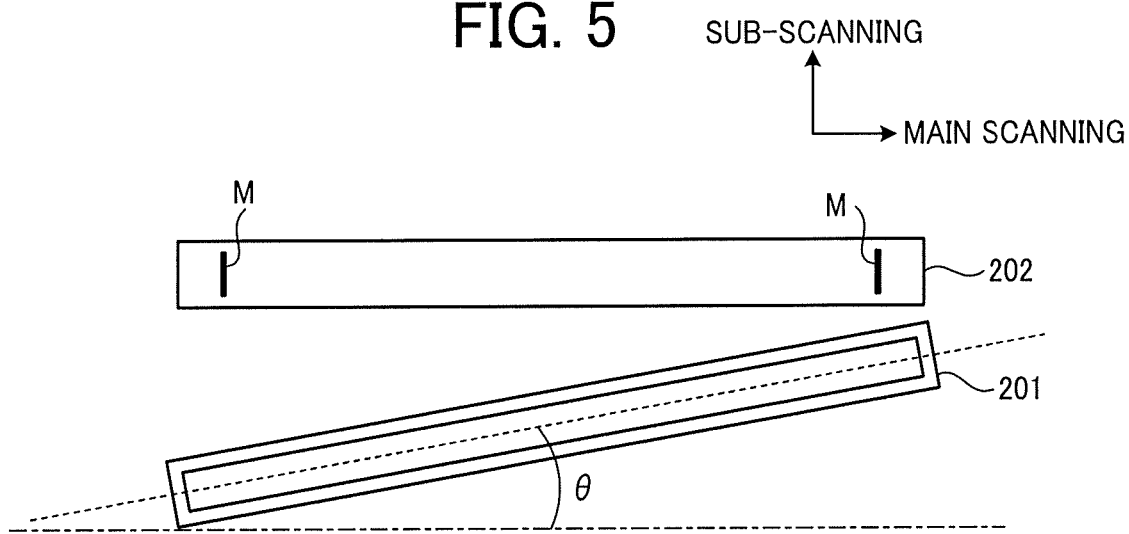
FIG. 5 is a diagram illustrating an example in which the reading device is installed obliquely with respect to a main scanning direction.
Figure 6:
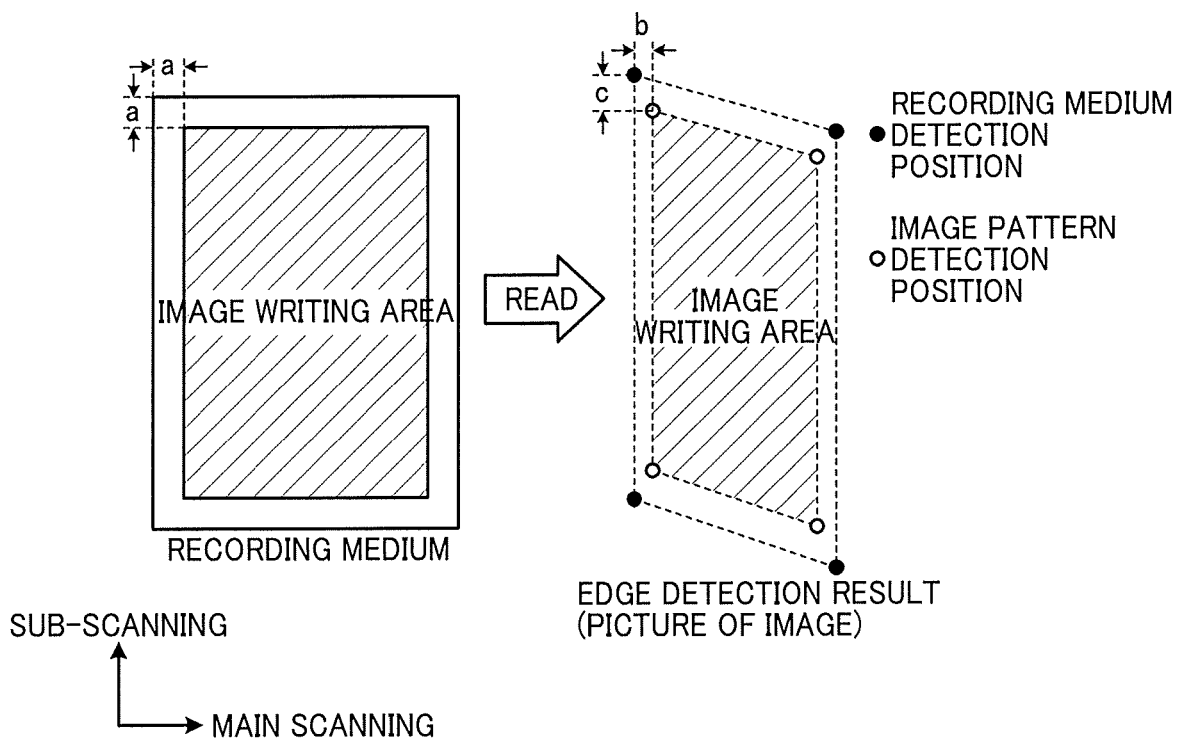
FIG. 6 is a diagram illustrating an exemplary position detection result by the reading device assembled inclined.

In addition, there are cases where the reading device 201 is installed obliquely with respect to the main scanning direction due to assembly variations at the time of manufacturing. FIG. 5 is a diagram illustrating an example in which the reading device 201 is installed obliquely with respect to the main scanning direction, and FIG. 6 is a diagram illustrating an example of a position detection result by the reading device 201 assembled obliquely. As illustrated in FIG. 5, also in the case where the reading device 201 is installed obliquely with respect to the main scanning direction, a picture of the recording medium read by the reading device 201 is distorted as illustrated in FIG. 6, and thus the position cannot be correctly detected, which results in erroneous image position correction is performed.

This means that if not only the main scanning position but also the inclination amount can be accurately detected in the aforementioned position detection at the time of installation of the reading device 201, further improvement in quality can be expected. Note that it is assumed that the inclination amount at the time of installation of the reading device 201 is small and that the shift amount in the main scanning position is negligibly small as compared to the shift amount in the sub-scanning position.

Note that in the detection of the inclination amount at the time of installation of the reading device 201 described above, it is necessary to use the detection result of expansion or contraction of the reading device 201 as a correction amount. In the case where the reading device 201 is expanded/contracted (or warped) due to heat, the read result by the reading device 201 includes the influence of expansion/contraction (warping) of the device itself. That is, in the inclination amount detection by the reading device 201, in the case where the inclination is detected as it is despite the fact that two factors (composite factor) of "assembly inclination" and "expansion or contraction of the sensor" are included, a detection error occurs.

Figure 7:
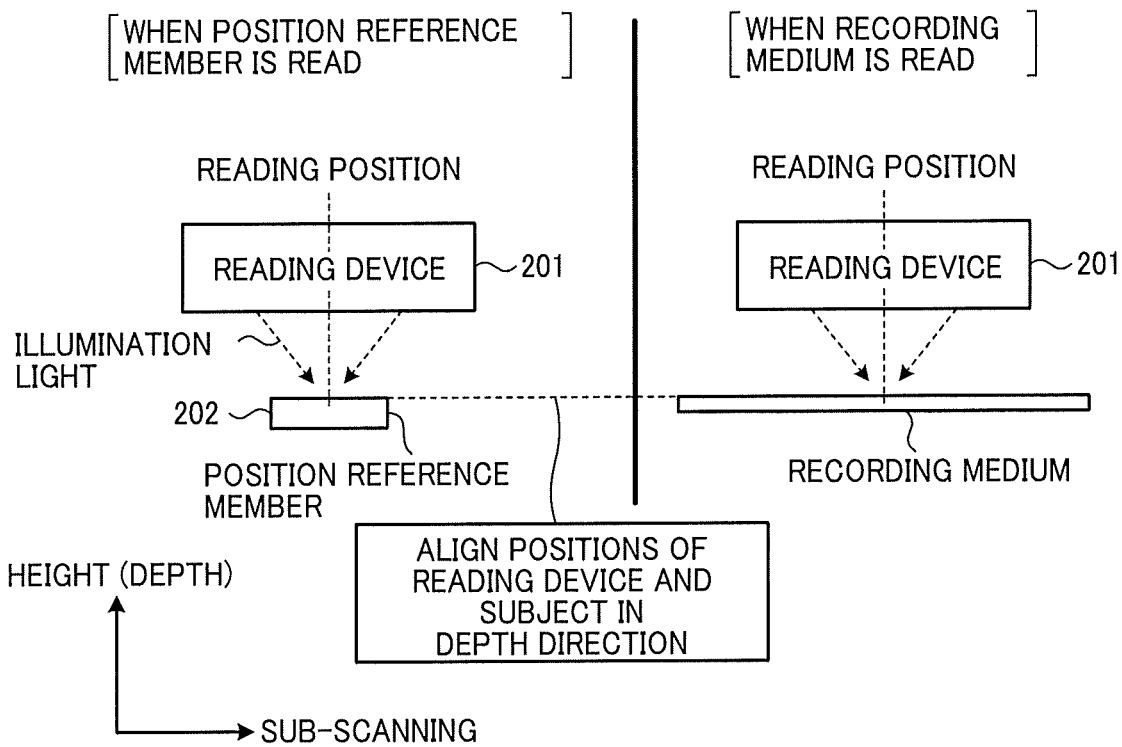
FIG. 7 is a diagram illustrating a positional relationship in the depth direction between the position reference member and the reading device.

FIG. 7 is a diagram illustrating a positional relationship in the depth direction between the position reference member 202 and the reading device 201. Normally, the reading device 201 such as CIS has a characteristic that image characteristics change depending on the height (depth) direction. Typical examples of such image characteristics generally include the followings:

MTF (depth of focus); and

Illumination depth. Furthermore, depending on a reading device 201, some has different characteristics depending on the position in the main scanning direction in addition to the dependency on the height (depth) direction.

Therefore, in the present embodiment, the position reference member 202 and the reading device 201 are arranged such that the position in the depth (height) direction at which the reading device 201 reads the recording medium coincides with the position in the depth (height) direction at which the reading device 201 reads the marks M on the position reference member 202. This minimizes the influence of a difference in image characteristics of the reading device 201 dependent on the depth direction, which can improve the accuracy of position detection.

Figure 8:
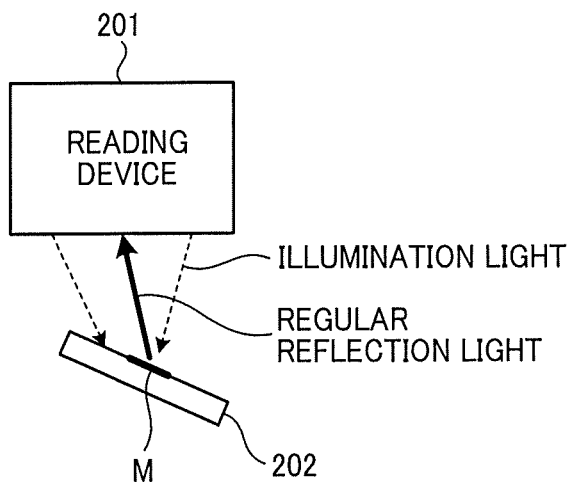
FIG. 8 is a diagram illustrating another example of a positional relationship between the position reference member and the reading device.

FIG. 8 is a diagram illustrating another example of a positional relationship between the position reference member 202 and the reading device 201. The clearer the brightness of the mark M which is the reference line on the position reference member 202, the easier the detection of the mark M by the reading device 201. Therefore, as illustrated in FIG. 8, the position reference member 202 may be tilted such that regular reflection light is incident on the reading device 201. With such a configuring, assuming that the mark M is black and does not sufficiently reflect back light, the contrast of brightness between areas with and without the mark M on the position reference member 202 can be emphasized, and the mark M can be detected more easily. Moreover, in the case of using glass as the position reference member 202, by providing a white member as the background of the glass, the aforementioned contrast of brightness can be made conspicuous. Furthermore, the mark M may be white with the background being black.

Figure 9:
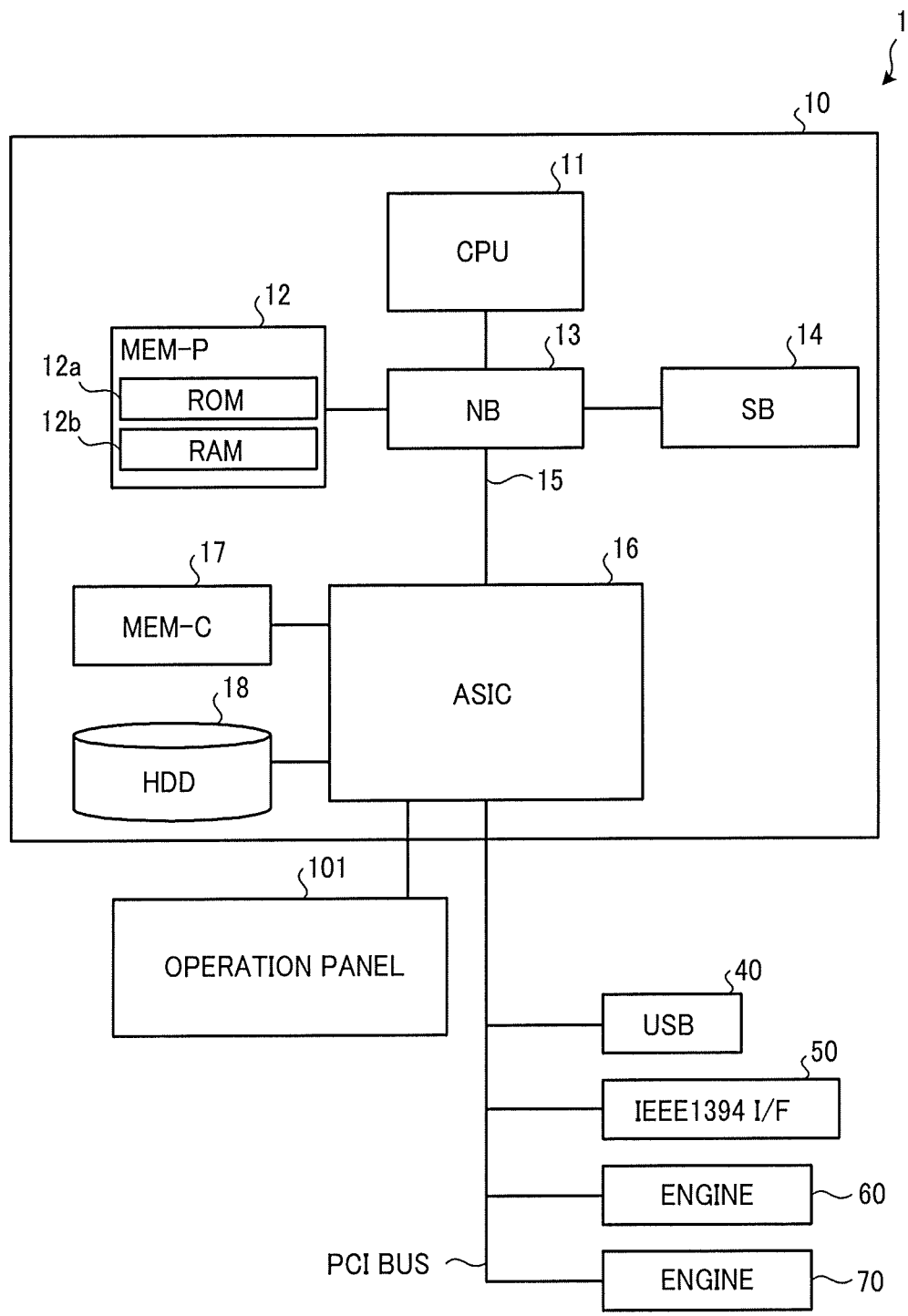
FIG. 9 is a block diagram illustrating an example of electrical connection of hardware of the printing system.

FIG. 9 is a block diagram illustrating an example of electrical connection of hardware of the printing system 1.

As illustrated in FIG. 9, the printing system 1 has a controller 10, an engine 60, and another engine 70 connected by a peripheral component interconnect (PCI) bus. The controller 10 controls the entire control of the printing system 1, drawing, communication, and input from the operation panel 101 which is the operation display. The engine 60 is connectable to the PCI bus and may be, for example, a scanner engine such as the reading device 201. In addition to the engine part, the engine 60 includes image processing parts such as shading correction or gamma conversion. The engine 70 is connectable to the PCI bus and may be, for example, a print engine such as a plotter including the image formers 103Y, 103M, 103C, and 103K.

The controller 10 includes a central processing unit (CPU) 11, a north bridge (NB) 13, a system memory (MEM-P) 12, a south bridge (SB) 14, a local memory (MEM-C) 17, an application specific integrated circuit (ASIC) 16, and a hard disk drive (HDD) 18, and the north bridge (NB) 13 and the ASIC 16 are connected by an accelerated graphics port (AGP) bus 15. The MEM-P 12 further includes a read-only memory (ROM) 12a and a random-access memory (RAM) 12b.

The CPU 11 performs overall control of the printing system 1, has a chip set including the NB 13, the MEM-P 12, and SB 14, and is connected with other devices via this chip set.

The NB 13 is a bridge for connecting the CPU 11 with the MEM-P 12, the SB 14, and the AGP bus 15, and has a memory controller for controlling reading and writing to the MEM-P 12, a PCI master, and an AGP target.

The MEM-P 12 is a system memory used as a memory for storing programs or data, a memory for developing programs or data, a drawing memory for the printer, and other types of memory, and includes the ROM 12a and the RAM 12b. The ROM 12a is a read-only memory used as a memory for storing programs or data, and the RAM 12b is a writable and readable memory used as a memory for developing programs or data, a drawing memory for a printer, and other types of memory.

The SB 14 is a bridge for connecting the NB 13 and PCI devices and peripheral devices. The SB 14 is connected with the NB 13 via a PCI bus, and a network interface (I/F) and other interfaces are also connected to this PCI bus.

The ASIC 16 is an integrated circuit (IC) for image processing having a hardware element for image processing and functions as a bridge connecting the AGP bus 15, the PCI bus, the HDD 18, and the MEM-C 17. The ASIC 16 includes a PCI target, an AGP master, an arbiter (ARB) forming the core of the ASIC 16, a memory controller to control the MEM-C 17, a plurality of direct memory access controllers (DMACs) to rotate image data by hardware logic or the like, and a PCI unit to transfer data between the engine 60 and the engine 70 via the PCI bus. The ASIC 16 is connected with a universal serial bus (USB) 40 and the Institute of Electrical and Electronics Engineers 1394 (IEEE 1394) interface (I/F) 50 via the PCI bus. The operation panel 101 is directly connected to the ASIC 16.

The MEM-C 17 is a local memory used as a copy image buffer and a code buffer, and the HDD 18 is a storage to accumulate image data, programs, font data, and forms.

The AGP bus 15 is a bus interface for a graphics accelerator card proposed for speeding up the graphics processing and directly accesses the MEM-P 12 with high throughput to accelerate the graphics accelerator card.

A program executed in the printing system 1 of the present embodiment may be recorded in a computer-readable recording medium such as a compact disc (CD)-ROM, a flexible disk (FD), a CD-R, or a digital versatile disk (DVD) as a file having a format installable or executable and thereby provided.

Furthermore, the program executed by the printing system 1 of the present embodiment may be stored on a computer connected to a network such as the Internet to be provided by being downloaded via the network. Further alternatively, the program executed in the printing system 1 of the present embodiment may be provided or distributed via a network such as the Internet.

[Description of Functional Configuration of Printing System 1]

Next, the functions that the CPU 11 of the printing system 1 exerts by executing the programs stored in the HDD 18 or the ROM 12a will be described. Note that description of conventionally known functions is omitted here, and characteristic functions exerted by the printing system 1 of the present embodiment will be described in detail.

Figure 10:
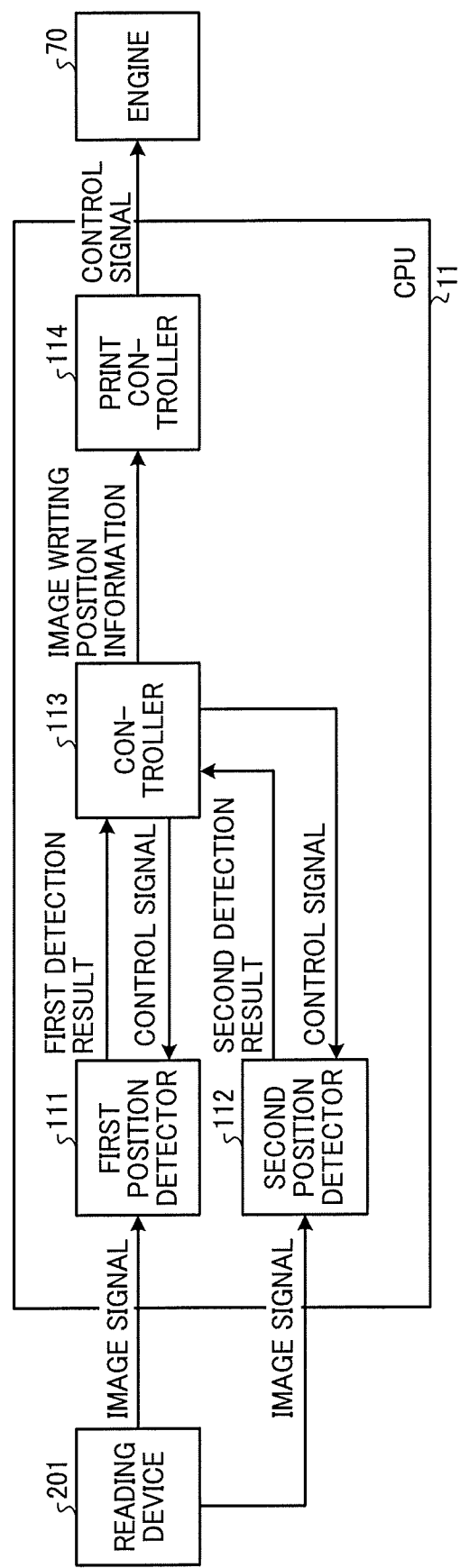
FIG. 10 is a functional block diagram illustrating a functional configuration of the printing system.

FIG. 10 is a functional block diagram illustrating a functional configuration of the printing system 1.

As illustrated in FIG. 10, the CPU 11 of the printing system 1 functions as a first position detector 111, a second position detector 112, a controller 113, and a print controller 114. Note that it should be understood without saying that the CPU 11 may implement the function as a conveyance controller or the like to control conveyance of a recording medium in addition to the first position detector 111, the second position detector 112, the controller 113, and the print controller 114.

Note that, in the present embodiment, the characteristic functions exerted by the printing system 1 are implemented by the CPU 11 executing the program; however, without being limited to this, for example a part or all of the functions of the above-described components may be implemented by a dedicated hardware circuit.

The first position detector 111 detects the outer shape of a recording medium and the position of an image pattern on the recording medium from an image read by a reading device 201 (first detection result).

Figure 11:
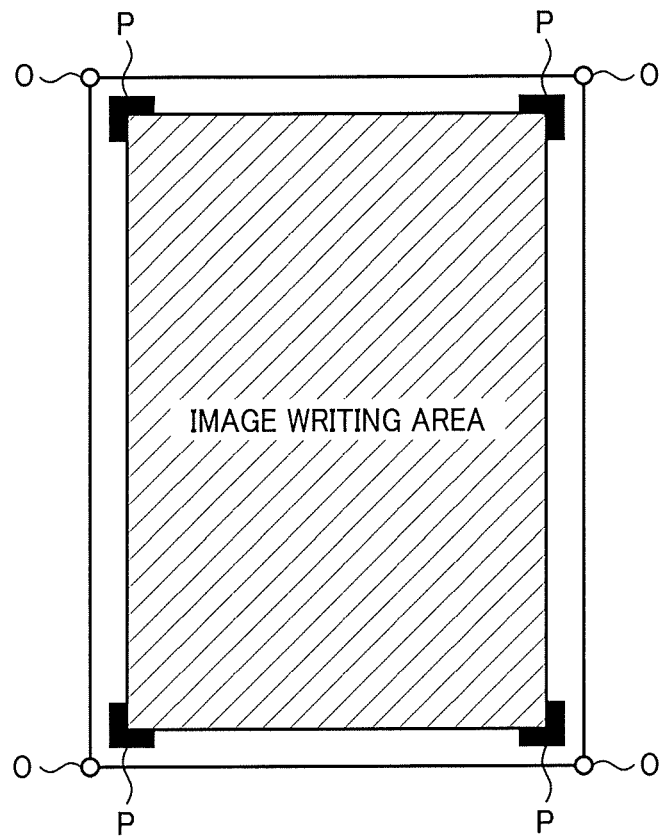
FIG. 11 is a diagram illustrating an outer shape of a recording medium and a position of an image pattern on the recording medium.

Here, FIG. 11 is a diagram illustrating the outer shape of the recording medium and the position of the image pattern on the recording medium. As illustrated in FIG. 11, the outer shape of the recording medium is estimated by detecting the positions of the four corners O of the recording medium. The position of the image pattern on the recording medium is estimated by detecting the positions of L-shaped image patterns P formed in the vicinity of the four corners O of the recording medium defining an image writing area.

In the above manner, the first position detector 111 obtains the two detection results of the position of the recording medium (the outer shape of the recording medium) and the position of the image pattern as the first detection result.

The second position detector 112 detects the positions of the marks M arranged on the position reference member 202 from the image read by the reading device 201 (second detection result).

Then, the controller 113 grasps the state of the reading device 201 depending on the second detection result to hold the state as a correction parameter. The controller 113 further detects the expansion/contraction amount of the reading device 201 on the basis of the first detection result and the imaging element of the reading device 201 which has detected the second detection result and corrects a processing position (image writing position) on the recording medium to be processed.

In the installation example illustrated in FIG. 2, the reference position of the position reference member 202 is set as the reference position (support point) of the reading device 201 that is substantially at the center in the main scanning direction at a low temperature. As illustrated in FIG. 2, in the case where the approximate center of the reading device 201 is the reference position (support point), expansion and contraction of the substrate of the reading device 201 occurs from the reference position toward the main scanning front end and the rear end. However, even in the case where pixel positions of the reading device 201 are displaced due to expansion or contraction of the substrate of the reading device 201, the controller 113 can accurately correct inclination of the reading device 201 by reading the marks M of the position reference member 202 and performing the following processing.

1. Detect the position of the marks M arranged on the position reference member 202 to determine the correction value (first correction value) of the main scanning position (detection of sensor expansion/contraction).

2. Correct the inclination amount (second correction value) of the reading device 201 obtained from the position of the marks M by using the result obtained from 1 (detection of assembly inclination).

Figure 12:
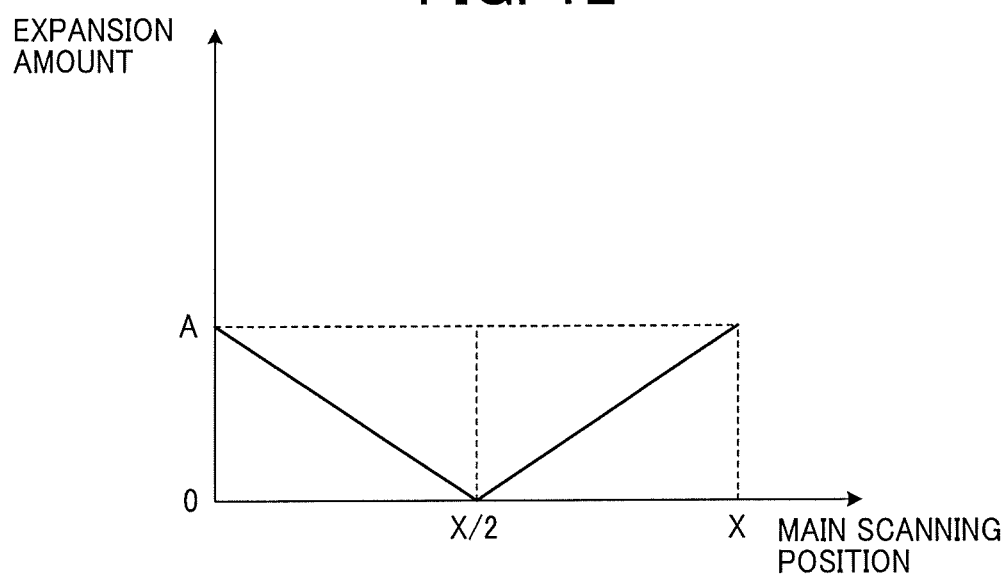
FIG. 12 is a diagram for explaining differences in the shift amount depending on the main scanning position of the reading device.

Here, FIG. 12 is a diagram for explaining differences in the shift amount depending on the main scanning position of the reading device 201. The example illustrated in FIG. 12 is the case where the pixel number X/2, which corresponds to a half of the total number of pixels X, is set as the reference position (support point). As illustrated in FIG. 12, in the case where the approximate center X/2 in the main scanning direction is the reference, if the expansion amount is bilaterally symmetrical and proportionally rises with respect to the main scanning position, the expansion amount increases towards the leading and trailing edges in the main scanning direction with X/2 being the center. As described above, the plurality of marks M (vertical lines) of the position reference member 202 is provided at the known width (D [mm]) from the reference position, and the controller 113 determines the correction value in the main scanning direction from the pixel positions where the marks M (vertical lines) have been detected.

Figure 13:
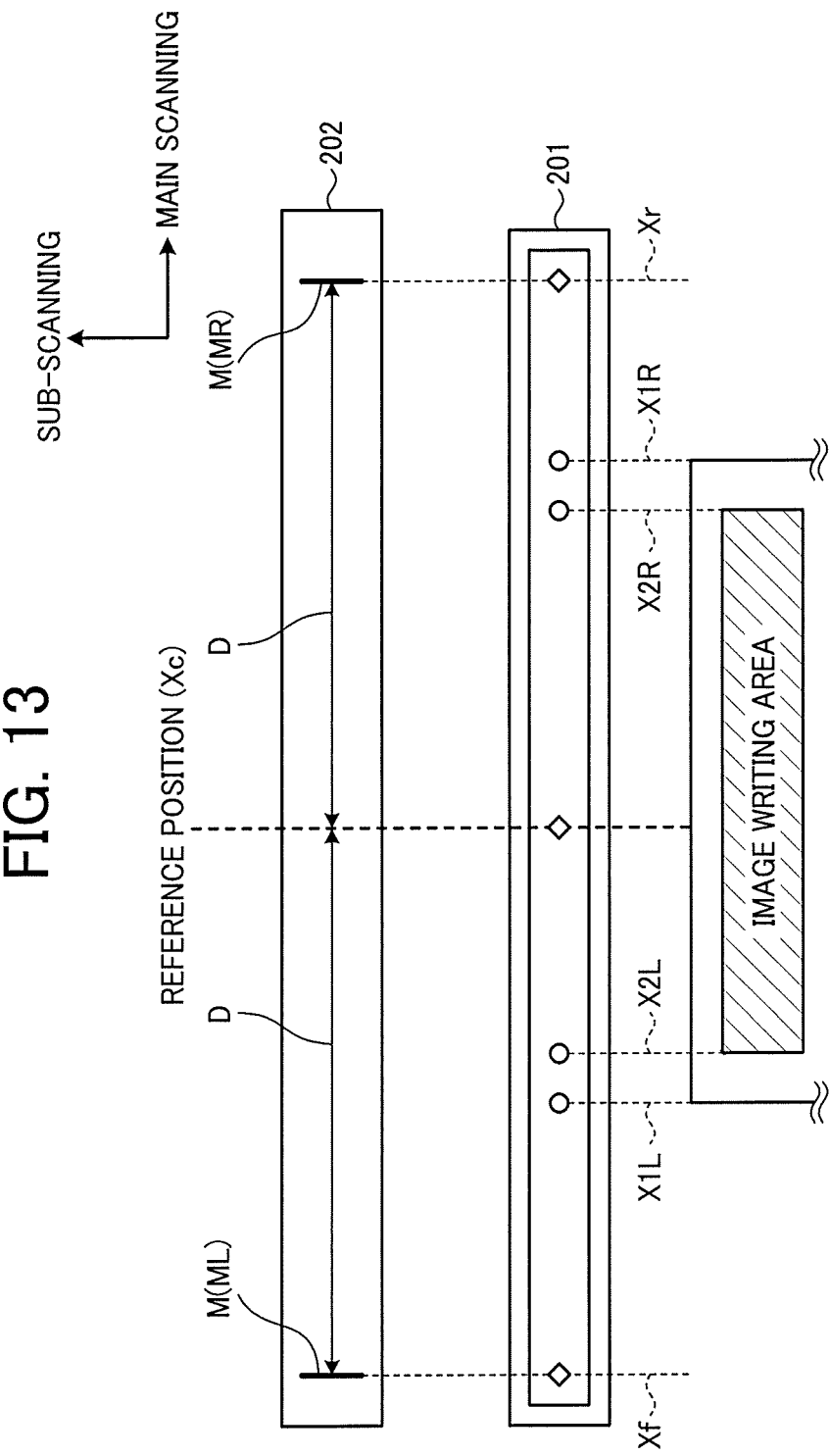
FIG. 13 is a diagram illustrating detection of correction parameters.

FIG. 13 is a diagram illustrating detection of correction parameters.

The pixel, on which the mark M (vertical line) on the left of the position reference member 202 illustrated in FIG. 13 is detected, is defined as an Xf-th pixel, and the pixel, on which the mark M (vertical line) on the right of the position reference member 202 is detected, is defined as an Xr-th pixel. That is, as illustrated in FIG. 13, in the standard environment (for example, at a low temperature), the second position detector 112 detects pixel numbers Xf and Xr (unit: dot) corresponding to the positions of the marks M (ML and MR) arranged on the position reference member 202 from the image read by the reading device 201 as correction parameters (second detection result).

Then, the first position detector 111 detects the outer shape of a recording medium and the position of an image pattern on the recording medium from the image read by the reading device 201 (first detection result). Here, the first detection result is defined to include:

Head position of recording medium: X1L (unit: dot);
Tail position of recording medium: X1R (unit: dot);
Head position of image pattern: X2L (unit: dot); and
Tail position of image pattern: X2R (unit: dot).

Next, the controller 113 calculates physical lengths pix_f and pix_r per pixel (imaging element) of the reading device 201 using the correction parameters (Xf and Xr). In the case where a pixel number Xc of the reading device 201 corresponds to the reference position, pix_f and pix_r are calculated from the following equations.

From the reference position to the head in the main scanning direction: $pix\_f=D/Xc-Xf$(unit: mm/dot).

From the reference position to the tail in the main scanning direction: $pix\_r=D/Xr-Xc$(unit: mm/dot).

Then, the controller 113 corrects the image writing position on the recording medium. The main scanning positions X'af and X'ar after correction for a desired main scanning position Xa are expressed by the following expressions. Hereinafter, a single quotation mark (') is added to a parameter obtained by converting the main scanning position/sub-scanning position into the length.

$X'af=Xa\times pix\_f$(where $Xa<Xc$)(unit: mm)

$X'ar=Xa\times pix\_r$(where $Xa>Xc$)(unit: mm)

In addition, the controller 113 detects the inclination amount (second correction value) of the reading device 201 with respect to the main scanning direction to perform correction in the sub-scanning direction.

In the case where the reading device 201 is installed at an angle θ with respect to the main scanning direction, further correction is performed in the sub-scanning direction. The inclination amount (second correction value) of the reading device 201 can be detected, for example, from a difference in the number of lines from which edges of the two marks M (vertical lines) are read when the marks M (vertical lines) which are the reference lines are read in scanning operation in the sub-scanning direction by the reading device 201.

Figure 14:
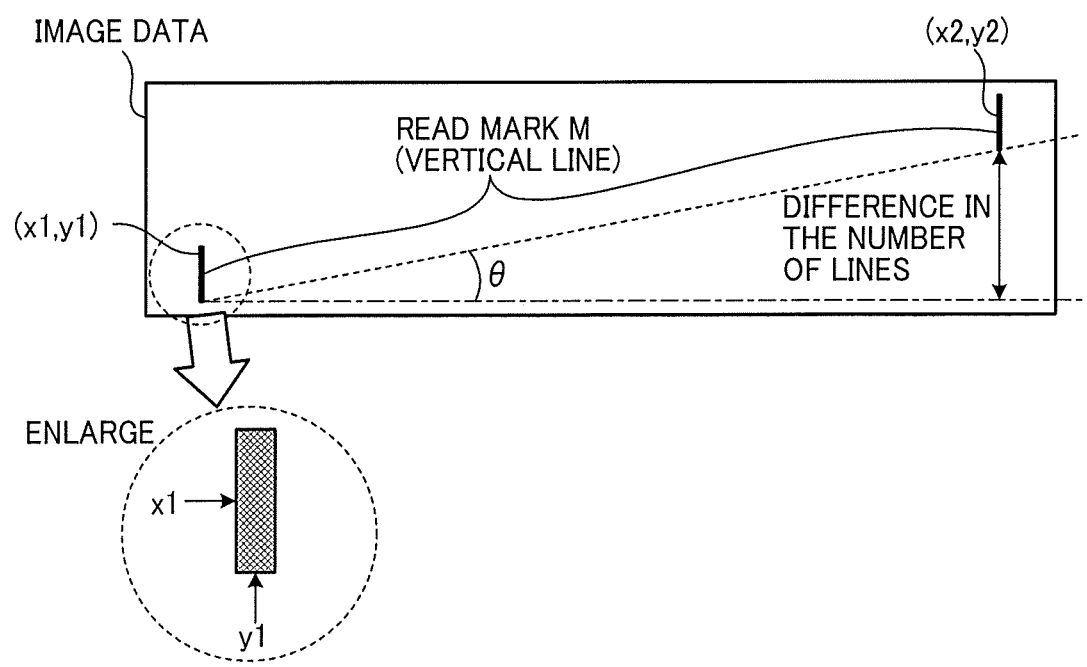
FIG. 14 is a diagram illustrating a detection method of the inclination amount.

Here, FIG. 14 is a diagram illustrating a detection method of the inclination amount. FIG. 14 is a diagram illustrating image data obtained by reading the position reference member 202 by the reading device 201 installed at an inclination of θ with respect to the main scanning direction. In the image data illustrated in FIG. 14, two marks M on the position reference member 202 are vertical lines; however from a microscopic point of view, the marks M can be grasped as rectangles. As in an enlarged view of a mark M in the image data illustrated in FIG. 14, the controller 113 can obtain two pieces of information, main scanning information x1 (x2) and sub-scanning information y1 (y2).

The controller 113 obtains the main scanning position of the reference position of the reading device 201 as X'c, the sub-scanning position of the reference position of the reading device 201 as Y'c, and position information in the sub-scanning direction when the marks M (vertical lines) are read as Y'af and V'ar. Then, the controller 113 calculates inclination amounts (second correction values) of the reading device 201 separately as slope_f and slope_r on the basis of the following equations.

$slope\_f=(Y'c-Y'af)/(X'C-X'af)$ $slope\_r=(Y'ar-Y'C)/(X'ar-X'c)$

Ideally, slope_f and slope_r coincide. However, depending on the mounting state of the imaging device (CMOS image sensor) of the reading device 201, there may be cases where they do not coincide. Here, using the corrected main scanning positions (X'af and X'ar) as in the above equations allows for accurate detection of the inclination of the reading device 201.

Figure 15:
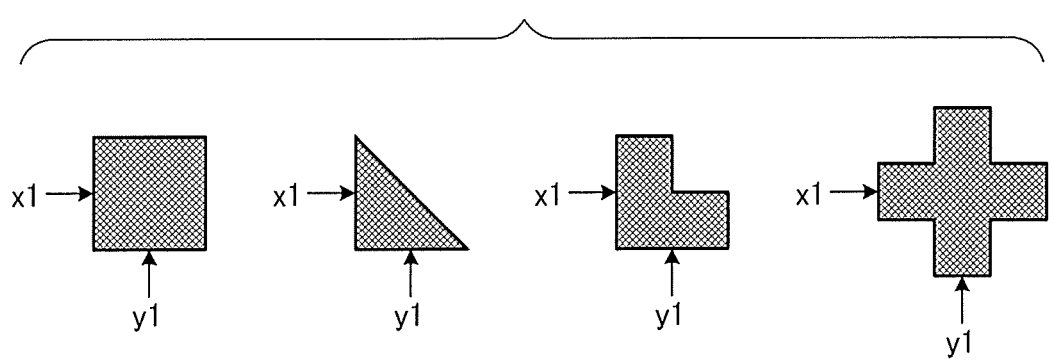
FIG. 15 is a diagram illustrating other examples of a mark serving as a reference line.

FIG. 15 is a diagram illustrating other examples of a marks M serving as a reference line. As illustrated in FIG. 15, a mark M serving as the reference line is not limited to a vertical line and may be implemented with various marks such as a square, a triangle, an L-letter, or a cross.

The controller 113 outputs a control signal indicating an edge detection start timing to the first position detector 111 and the second position detector 112. The first position detector 111 and the second position detector 112 perform processing for detecting an outer shape of a recording medium and the position of an image pattern on the recording medium with the edge detection start timing as a starting point or perform processing for detecting the positions of the marks M arranged on the position reference member 202.

The controller 113 converts the image writing position on the recording medium corrected by using the correction parameters (Xf, Xr) into image writing position information and notifies the print controller 114 of the image writing position information.

The print controller 114 controls the engine 70 on the basis of the image writing position information notified from the controller 113 to control the image writing on the recording medium.

Next, processing of notifying an image writing position executed by the printing system 1 will be described.

Figure 16:
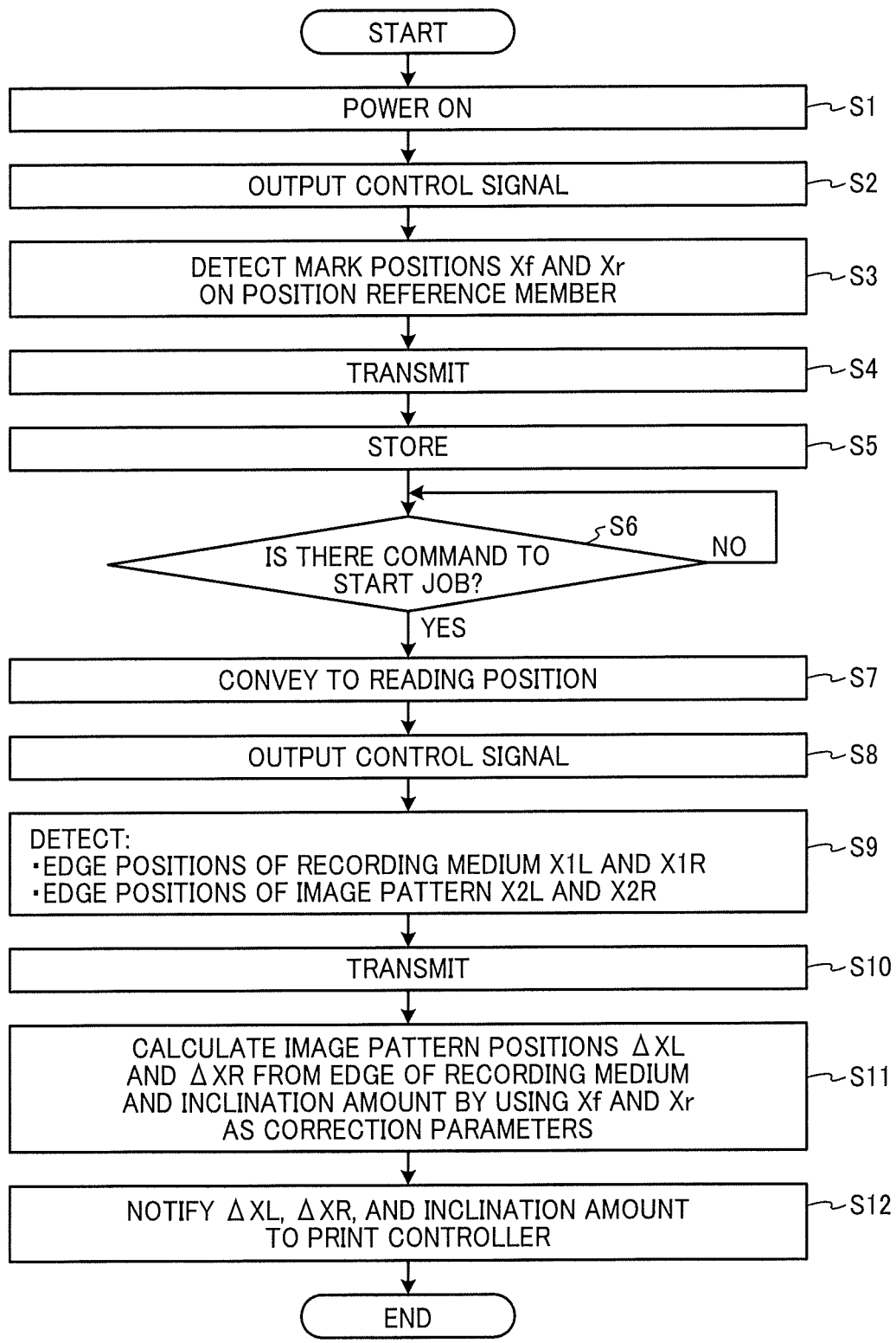
FIG. 16 is a flowchart schematically illustrating a flow of processing of notifying an image writing position.

FIG. 16 is a flowchart schematically illustrating a flow of processing of notifying an image writing position. As illustrated in FIG. 16, when power is supplied to the printing system 1 by turning on the power (step S1), the controller 113 outputs a control signal, to the second position detector 112, for detecting the positions (Xf, Xr) of the marks M arranged on the position reference member 202 (step S2).

When receiving the control signal, the second position detector 112 controls the reading device 201 to read the marks M arranged on the position reference member 202 to detect the positions (Xf, Xr) of the marks M (step S3). The positions (Xf, Xr) of the marks M are detected so as to correspond to the two marks M arranged on the position reference member 202.

The second position detector 112 transmits the positions (Xf, Xr) of the marks M to the controller 113 as a detection result (step S4).

The controller 113 stores the transmitted positions (Xf, Xr) of the marks M in the RAM 12*b* or other components that is a storage (step S5).

Thereafter, the controller 113 stands by until receiving a command to start a print job from a user (No in step S6).

When the command to start the print job is received (Yes in step S6), the controller 113 conveys the recording medium on which the image pattern is printed to the reading position of the reading device 201 (step S7).

Next, the controller 113 outputs, to the first position detector 111, a control signal for detecting the outer shape of the conveyed recording medium and the position of the image pattern on the recording medium (step S8).

When receiving the control signal, the first position detector 111 controls the reading device 201 to read the outer shape of the conveyed recording medium and the position of the image pattern on the recording medium and determines the outer shape of the recording medium and the position of the image pattern on the recording medium (step S9). More particularly, the following positions are detected.

Head position of recording medium: X1L (unit: dot)
Tail position of recording medium: X1R (unit: dot)
Head position of image pattern: X2L (unit: dot)
Tail position of image pattern: X2R (unit: dot)

The first position detector 111 transmits the outer shape of the recording medium and the position of the image pattern on the recording medium to the controller 113 as a detection result (step S10).

Then, the controller 113 uses Xf and Xr as correction parameters to calculate ΔXL and ΔXR which are edge positions of the image pattern from the edge positions of the recording medium and to calculate the inclination amount of the reading device 201 (second correction value) (step S11). Here, the image position ΔXL from the head of the recording medium in the main scanning direction, the head serving as a reference, and the image position ΔXR from the tail of the recording medium in the main scanning direction, the tail serving as a reference, are defined as follows.

$$\Delta XL = (X2L - X1L) \times \text{pix\_}f[\text{mm}]$$

$$\Delta XR = (X1R - X2R) \times \text{pix\_}r[\text{mm}]$$

The controller 113 converts the image writing positions ΔXL and ΔXR of the recording medium and the inclination amount into the image writing position information and notifies the print controller 114 of the image writing position information (step S12).

As described above, according to the present embodiment, the position reference member 202 is installed, and the positions of the marks M on the position reference member 202 are detected by the reading device 201, thereby obtaining the correction value (first correction value) for the pixel positional deviation in the main scanning direction due to the heat in the reading device 201 and correcting the inclination amount (second correction value) of the mounting angle of the reading device 201 with the correction value (main scanning position deviation) to correct the writing position. As a result, the accuracy of the following detection results can be improved.

Position of image pattern printed on recording medium
Contour edge position of recording medium As a result, correction of the mounting angle of the reading device 201 can be accurately performed, and the error in the position detection result, generated by expansion and contraction of the reading device 201 caused by generated heat, can be reduced.

In addition, by detecting the positions of the marks M on the position reference member 202 each time power is supplied, the expansion and contraction state of the reading device 201 is periodically grasped, and the correction parameters are updated. As a result, stabilization of detection accuracy can be expected.

Note that, in the present embodiment, a CIS which is a so-called equal magnification optical system is applied as the reading device 201; however, embodiments of the present disclosure are not limited thereto. For example, the reading device 201 may be a reading device of a so-called reducing optical system including a light source, a plurality of reflecting members (mirrors), an imaging forming lens, a linear image sensor, and other components. Any device capable of detecting the position of a reading object can improve the position detection accuracy.

Note that, in the present embodiment, it is assumed that the reading device 201 expands bilaterally symmetrically and proportionally to the main scanning position from the center of the reading device 201; however, embodiments of the present disclosure are not limited thereto, and alternatively the arrangement of the vertical lines of the marks M which are the reference lines may be modified depending on the changing state of the reading device 201.

Figures 2, 17:
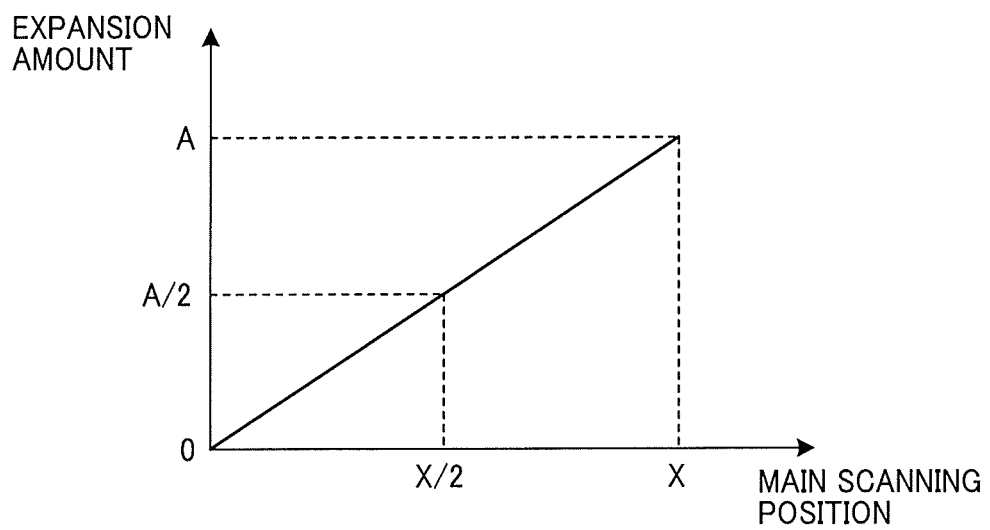

FIG. 17-1 is a schematic diagram illustrating another variation of the corresponding positional relationship between the reading device 201 and the position reference member 202 in the medium position detecting device 200, and FIG. 17-2 is a graph illustrating the expansion amount for each main scanning position. In FIG. 17-1, the state of the reading device 201 is illustrated at both (a) low temperature and (b) high temperature. As illustrated in FIG. 17-1, the position reference member 202 is installed with the position corresponding to the head pixel which is an imaging element at one end (head) of the reading device 201 in the main scanning direction at low temperature as a reference position (support point). In FIG. 17-1, it is premised that the expansion amounts (shift amount) of the pixels of the reading device 201 are uniform in the main scanning direction. In the case of the above premise, as illustrated in FIG. 17-2, where an expansion amount of pixels in the reading device 201 (with the reference position as a reference) at the pixel number of X when a certain temperature change (low temperature→high temperature) occurs is denoted with A, the expansion amount at the pixel number of X/2 is denoted with A/2. In other words, the cumulative error due to temperature expansion becomes larger toward the other end (tail) in the main scanning direction, and detection accuracy (error) also deteriorates.

As illustrated in FIG. 17-2, in the case where the expansion amount (shift amount) of pixels in the reading device 201 is proportional to the main scanning position, if there is a vertical line of a mark M at least at one place, any main scanning position can be corrected (a plurality of vertical lines of marks M is not always necessarily included on the position reference member 202).

Figures 2, 18:
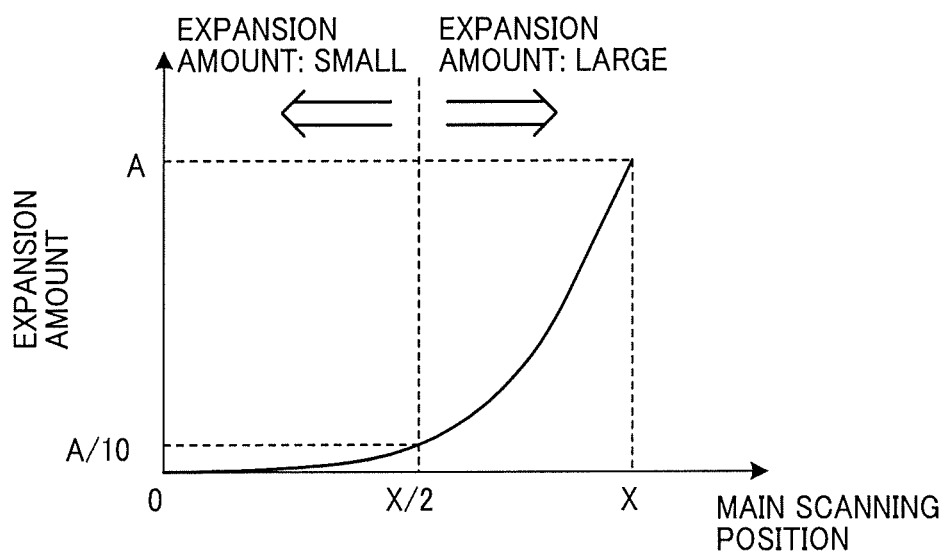

FIG. 18-1 is a schematic diagram illustrating another variation of the corresponding positional relationship between the reading device 201 and the position reference member 202 in the medium position detecting device 200, and FIG. 18-2 is a graph illustrating the expansion amount for each main scanning position. In the example illustrated in FIG. 18-1, the expansion amount of pixels of the reading device 201 remarkably rises as the pixels are closer to the tail in the main scanning direction. FIG. 18-2 illustrates an example in which the expansion amount at the pixel number of X is denoted as A and the expansion amount at the pixel number of X/2 is denoted as A/10.

As illustrated in FIG. 18-2, in the case where the expansion amount (shift amount) of pixels of the reading device 201 does not rise proportionally to the main scanning position, if a function of the expansion amount (shift amount) is known, just one vertical line of one mark M is sufficient. Alternatively, if the function of the expansion amount (shift amount) is unknown, considering simply dividing into two regions, such as that the expansion amount (shift amount) in the vicinity of the reference position is small and that the expansion amount (shift amount) at a position away from the reference point is large, it is sufficient to consider the physical length per pixel of the reading device 201 for each of the regions, such as D1 and D2.

Second Embodiment

Next, a second embodiment will be described.

The second embodiment is different from the first embodiment, in which only the vertical line is used as the mark M, in that a horizontal line is used in addition to the vertical line as a mark M which is a reference line on a position reference member 202. In the following description of the second embodiment, descriptions of the same component as that in the first embodiment will be omitted, and components different from the first embodiment will be described.

Figure 19:
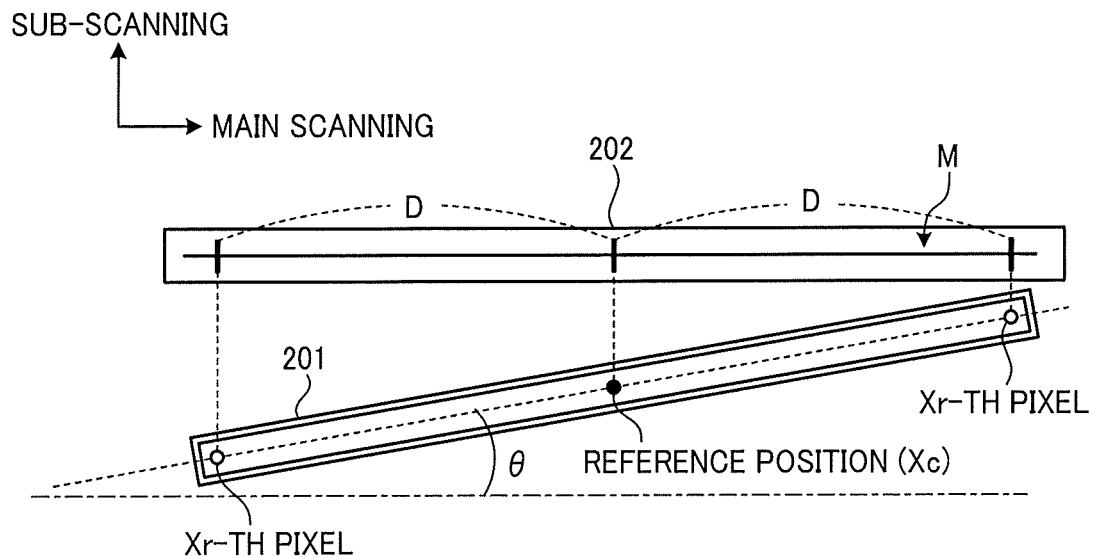
FIG. 19 is a schematic diagram illustrating a corresponding positional relationship between a reading device and a position reference member in a medium position detecting device according to a second embodiment.

FIG. 19 is a schematic diagram illustrating a corresponding positional relationship between a reading device 201 and a position reference member 202 in a medium position detecting device 200 according to the second embodiment. In FIG. 19, an example in which the reading device 201 is installed obliquely with respect to the main scanning direction is illustrated.

As illustrated in FIG. 19, the position reference member 202 has a mark M including two types of reference lines having different angles. In the present embodiment, one of the two types of reference lines having different angles is a "vertical line" which is a first reference mark parallel to the sub-scanning direction and is arranged at a position corresponding to the head pixel which is an imaging element at one end (head) of the reading device 201 in the main scanning direction and a position corresponding to the tail pixel which is an imaging element at the other end (tail) of the reading device 201 in the main scanning direction. The other one of the two types of reference lines having different angles is a "horizontal line" which is a second reference mark parallel to the main scanning direction of the reading device 201. Note that, in the present embodiment, the "vertical line" of the mark M is arranged at each of the position corresponding to the head pixel and the position corresponding to the tail pixel; however, embodiments of the present disclosure are not limited thereto, and the vertical line may be arranged at a position other than the positions corresponding to the head pixel or the tail pixel.

Even in the case where pixel positions of the reading device 201 are displaced due to expansion or contraction of a substrate of the reading device 201, the controller 113 can accurately correct inclination of the reading device 201 by reading the mark M of the position reference member 202 and performing the following processing.

1. Detect the position of the mark M (vertical line) arranged on the position reference member 202 to determine a correction value (first correction value) of the main scanning position (detection of sensor expansion/contraction).

2. Correct the inclination amount (second correction value) of the reading device 201 obtained by detecting the mark M (horizontal line) arranged on the position reference member 202 by using the result obtained from 1 (detection of assembly inclination).

The controller 113 performs processing similar to the correction in the main scanning direction described with reference to FIG. 13 for the correction in the main scanning direction in the item 1 above.

In addition, the controller 113 detects the inclination amount (second correction value) of the reading device 201 with respect to the main scanning direction to perform correction in the sub-scanning direction.

Figure 20:
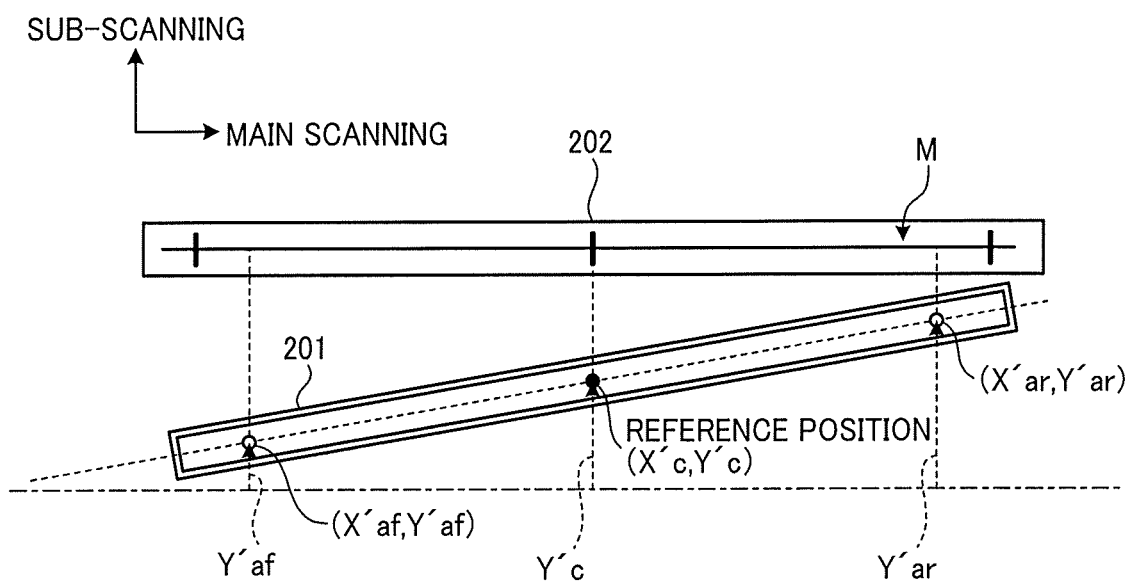
FIG. 20 is a diagram illustrating a detection method of the inclination amount and a correction method of the sub-scanning direction.

FIG. 20 is a diagram illustrating a detection method of the inclination amount and a correction method in the sub-scanning direction. As illustrated in FIG. 20, the controller 113 obtains the main scanning position of the reference position of the reading device 201 as X'c, the sub-scanning position of the reference position of the reading device 201 as Y'c, and position information in the sub-scanning direction when the mark M (horizontal line) is read as Y'af and Y'ar. Then, the controller 113 calculates inclination amounts (second correction values) of the reading device 201 separately as slope_f and slope_r on the basis of the following equations.

$$slope\_f = (Y'c - Y'af)/(X'C - X'af)$$

$$slope\_r = (Y'ar - V'C)/(X'ar - X'c)$$

Ideally, slope_f and slope_r coincide. However, depending on the mounting state of sensor elements of the reading device 201, slope_f and slope_r may not coincide. Here, using the corrected main scanning positions (X'af and X'ar) as in the above equations allows for accurate detection of the inclination of the reading device 201.

When the mark M (horizontal line) is longer than the width of the imaging element (CMOS image sensor) of the reading device 201, the controller 113 can obtain a desired sub-scanning position Y'a on the reading device 201 from the following equation.

$$Y'a = Y'c - slope\_f \times (X'c - X'a) \text{ (where } Y'a < Y'c\text{)}$$

$$Y'a = Y'c + slope\_r \times (X'a - X'c) \text{ (where } Y'a > Y'c\text{)}$$

The controller 113 can correct for the inclination of the reading device 201 even in the case where there is a change in the state of the reading device 201 by correcting a sub-scanning position Y'a on the reading device 201 to the sub-scanning position of the actually read image data.

As described above, according to the present embodiment, the position reference member 202 is installed, and the positions of the marks M on the position reference member 202 are detected by the reading device 201, thereby obtaining the correction value (first correction value) for the pixel positional deviation in the main scanning direction due to the heat in the reading device 201 and correcting the inclination amount (second correction value) of the mounting angle of the reading device 201 with the correction value (main scanning position deviation) to correct the writing position. As a result, the accuracy of the following detection results can be improved.

Position of image pattern printed on recording medium

Contour edge position of recording medium

As a result, correction of the mounting angle of the reading device 201 can be accurately performed, and the error in the position detection result, generated by expansion and contraction of the reading device 201 caused by generated heat, can be reduced.

Note that, in the present embodiment, the arrangement of the vertical lines and the horizontal line of the mark M which are reference lines has been described as being parallel to the sub-scanning direction and the main scanning direction, respectively, for simplifying the description (that is, the vertical lines and the horizontal line of the mark M are orthogonal to each other); however, embodiments of the present disclosure are not limited thereto. On the condition that how the mark M as the reference line is drawn on the position reference member 202 (at what angle a vertical and a horizontal line of the mark M are drawn) is known, calculation can be performed by substituting the angle information in the correction result.

Figure 21:
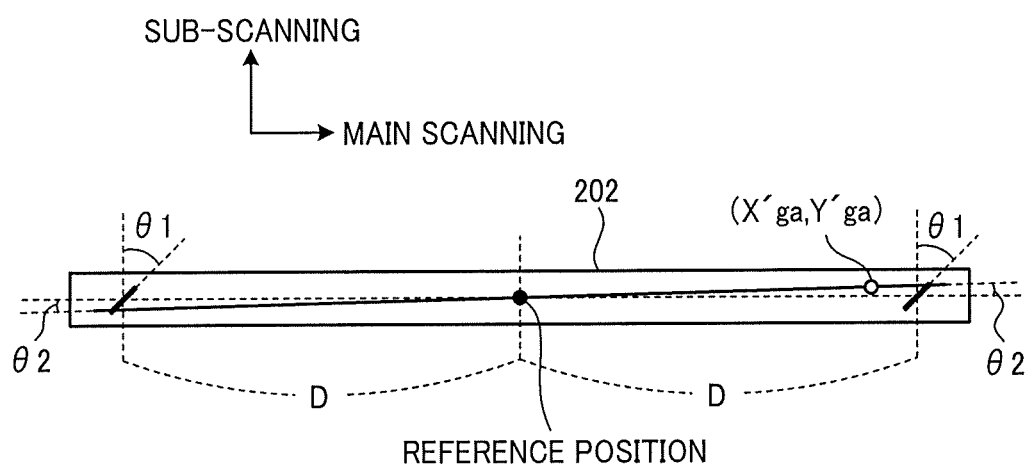
FIG. 21 is a diagram illustrating an example in which vertical lines and a horizontal line of a mark are not orthogonal to each other.

FIG. 21 is a diagram illustrating an example in which vertical lines and a horizontal line of a mark M are not orthogonal to each other. In the example illustrated in FIG. 21, the vertical lines of the mark M are provided at an angle of θ1 with respect to the sub-scanning direction, and the horizontal line of the mark M is provided at an angle of θ02 with respect to the main scanning direction.

For example, as illustrated in FIG. 21, assuming that the distance from the reference position to the center position of a vertical line of the mark M is denoted by the known value D, it is only required to grasp the central position of the vertical lines of the mark M to correct the main scanning position. That is, the angle θ1 formed by a vertical line of the mark M and the sub-scanning direction does not necessarily have to be common to all the vertical lines provided.

Meanwhile, in the case where the angle θ2 at which the horizontal line of the mark M is provided is known, a sub-scanning position Y'ga on the horizontal line for any main scanning position X'ga is a known value. Therefore, correction can be performed by adding or subtracting Y'ga to or from the numerator for obtaining the inclination slope_a of the reading device 201 by the above method.

Third Embodiment

Next, a third embodiment will be described.

The third embodiment is different from the first embodiment and second embodiments in that vertical lines of a plurality of marks M is arrayed at equal intervals on the position reference member 202 such that a vertical line of one mark M can be read for each sensor chip on a substrate of a reading device 201. In the following description of the third embodiment, descriptions of the same component as that in the first and second embodiments will be omitted, and components different from the first and second embodiments will be described.

Figure 22:
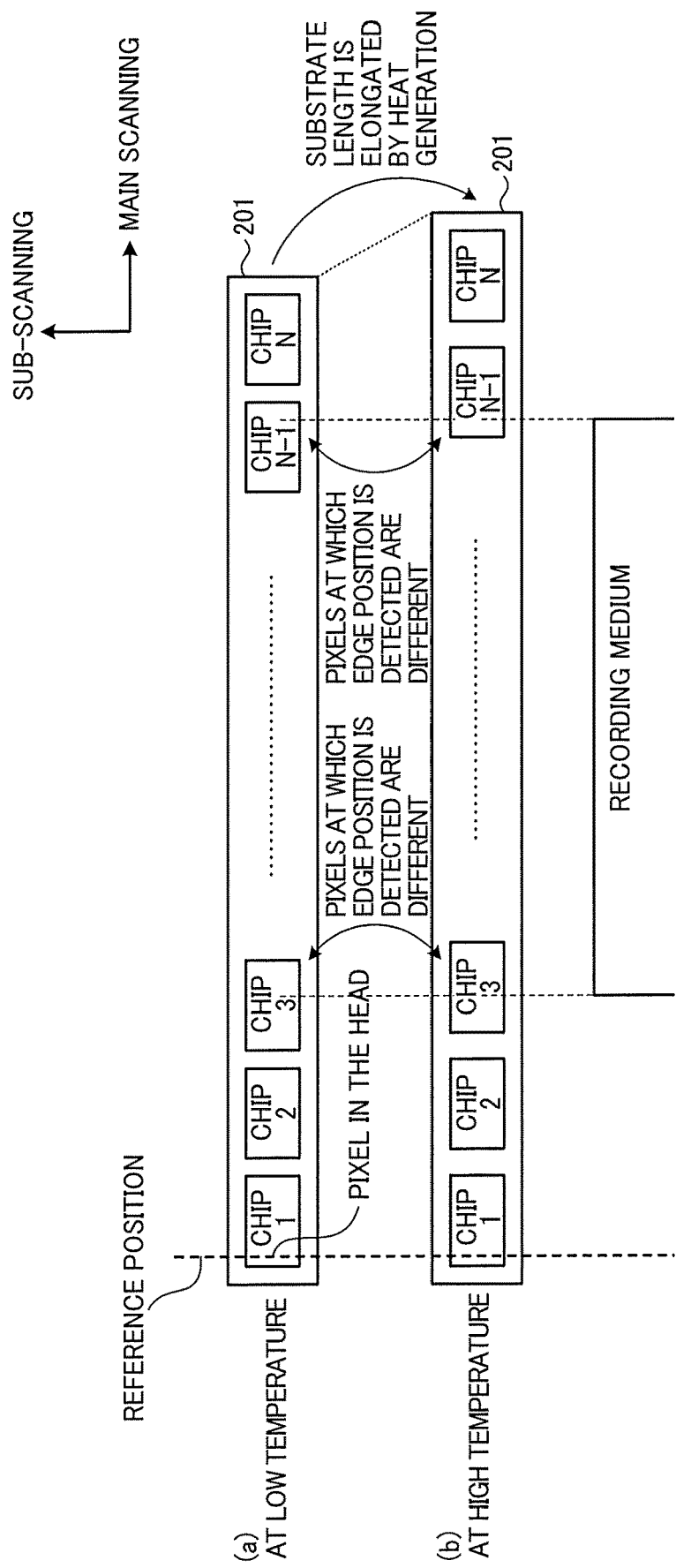
FIG. 22 is a diagram for explaining the actual state of a mounting position of a sensor chip of a reading device according to a third embodiment.

FIG. 22 is a diagram for explaining the actual state of a mounting position of a sensor chip of the reading device 201 according to the third embodiment. As illustrated in FIG. 22, a CIS applied to the reading device 201 is known to have a configuration in which generally a plurality of sensor chips, each having a plurality of pixels, is arrayed in the main scanning direction to secure a necessary effective reading length in the main scanning direction.

Figure 23:
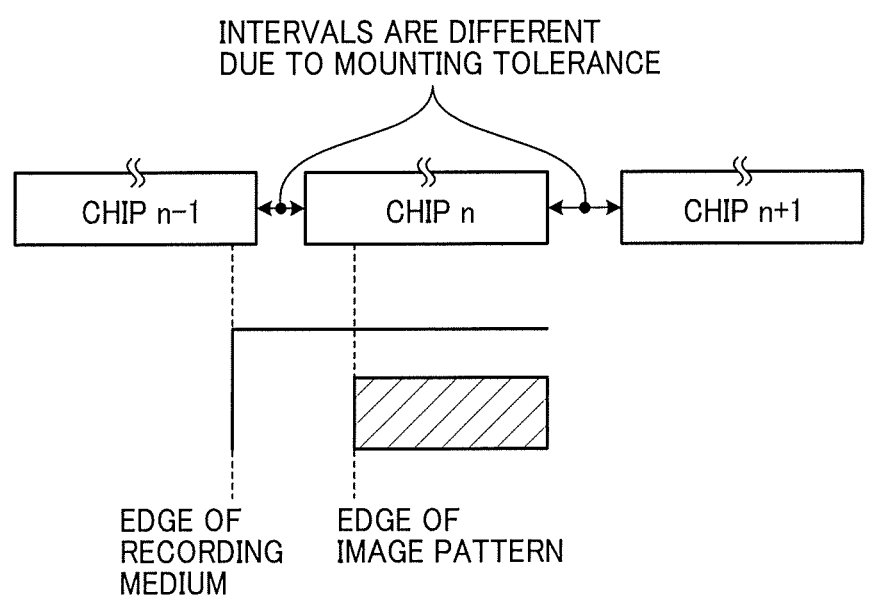
FIG. 23 is a diagram illustrating an example of how to mount sensor chips in the reading device.

Here, a problem of applying a CIS to the reading device 201 will be described. FIG. 23 is a diagram illustrating an example of how to mount sensor chips in the reading device 201. As illustrated in FIG. 23, gaps between adjacent sensor chips are usually provided at intervals of a predetermined physical length (e.g. one pixel), which is known to have tolerance. As illustrated in FIG. 23, the intervals between adjacent sensor chips of the reading device 201 are not necessarily equal. Therefore, as illustrated in FIG. 23, in the case where position detection is performed while the head position of a recording medium and the head position of an image pattern straddle over two adjacent sensor chips, there are problems that an interval between two adjacent sensor chips is unknown and that the value varies for each two adjacent sensor chips.

Furthermore, in general, a plurality of semiconductor parts to drive and control the sensor chips is mounted on a substrate on which the sensor chips are mounted, and the heat distribution of the entire substrate is not necessarily uniform due to differences in the arrangement (layout) of the respective parts on the substrate and in heating values of the respective parts. Therefore, the expansion/contraction amount depending on the position in the main scanning direction on the substrate of the reading device 201 is not uniform, and there is a possibility that the expansion/contraction amounts in gaps between adjacent sensor chips of the reading device 201 are not equal.

Therefore, in consideration of the above-described problem (position detection error factor), in order to further improve the position detection accuracy, the following configuration is conceivable.

Figure 24:
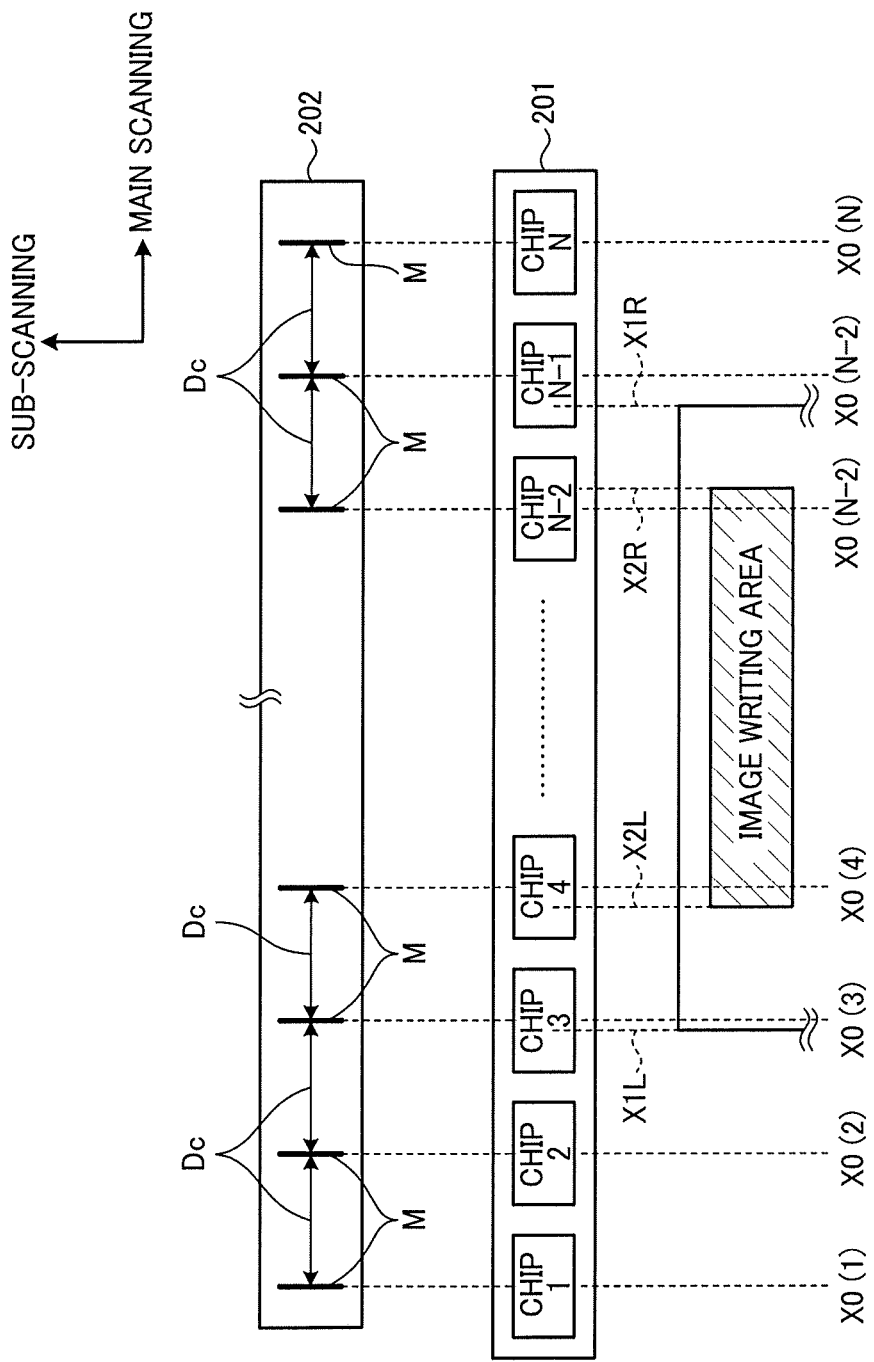
FIG. 24 is a schematic diagram illustrating a corresponding positional relationship between a reading device and a position reference member in a medium position detecting device.

FIG. 24 is a schematic diagram illustrating a corresponding positional relationship between the reading device 201 and the position reference member 202 in a medium position detecting device 200. As illustrated in FIG. 24, the length (main scanning width) of each of the sensor chips of the reading device 201 is shorter than the substrate length. Therefore, in the present embodiment, description will be given on the premise that the expansion/contraction amount of each pixel in a sensor chip of the reading device 201 is negligibly small as compared to the expansion/contraction amount of the substrate length of the reading device 201 and that a gap between adjacent sensor chips of the reading device 201 expands or contracts due to a temperature change.

As illustrated in FIG. 24, in the present embodiment, in order that a vertical line of a mark M can be read for each sensor chip on the substrate of the reading device 201, vertical lines of a plurality of marks M are arranged at equal intervals on the position reference member 202.

That is, as illustrated in FIG. 24, an interval between vertical lines of marks M which is a reference line arranged in the position reference member 202 is set to an ideal distance Dc, which is the distance between the Nth pixel of the Kth sensor chip and the Nth pixel of a sensor chip adjacent thereto ((K−1)th or (K+1)th pixel) to allow at least one vertical line of a mark M can be read for each sensor chip on the substrate of the reading device 201.

Prior to detecting the edge position of a recording medium or the edge position of an image pattern, the medium position detecting device 200 reads positions of vertical lines of the marks M on the position reference member 202 by the reading device 201 to detect the position of a vertical line of a mark M corresponding to each of the sensor chips of the reading device 201 and to set as a correction parameter.

Figure 25:
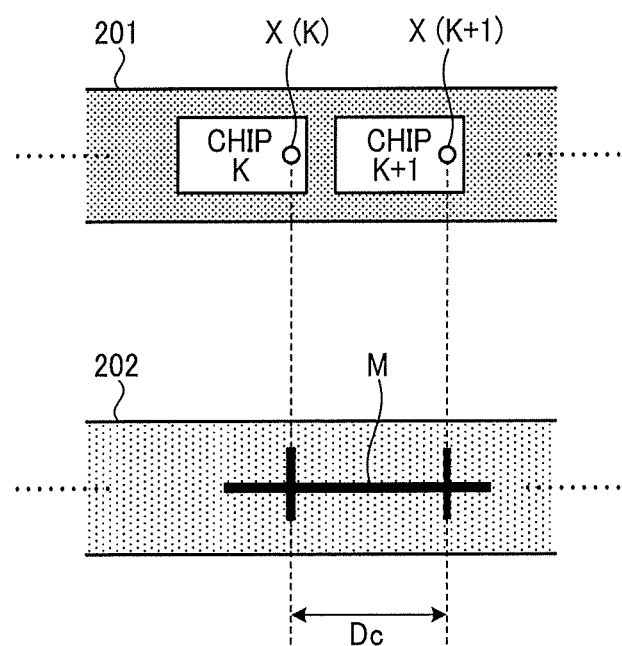
FIG. 25 is a diagram for exemplarily explaining a correction method of the main scanning position with respect to the reading device.

FIG. 25 is a diagram for exemplarily explaining a correction method of the main scanning position with respect to the reading device 201. As illustrated in FIG. 25, let X(K) be the pixel number at which a vertical line of a mark M is read in the Kth sensor chip, and let X(K+1) be the pixel number at which a vertical line of the mark M is read in the (K+1)th sensor chip. Then, the physical length: pix(K, K+1) that corresponds to one sensor pixel of the reading device 201 is expressed by the following equation.

$$Pix(K,K+1)=Dc/(X(K+1)-X(K))[mm/dot]$$

Therefore, the corrected main scanning position X'a at a desired main scanning position Xa is expressed by the following equation.

$$X'a=Xa \times pix(K,K+1)[mm]$$

(Where X(K)<Xa<X(K+1))

Note that, in the above description, the example of adjacent sensor chips has been illustrated; however, embodiments of the present disclosure are not limited thereto. For example, when the (K+n)th sensor chip is noted that is n chips away from the Kth sensor chip, the physical length: pix (K, K+1) corresponding to one sensor pixel of the reading device 201 is expressed by the following equation.

$$Pix(K,K+n)=(Dc \times n)/(X(K+n)-X(K))[mm/dot]$$

Therefore, the corrected main scanning position X'a at a desired main scanning position Xa is expressed by the following equation.

$$X'a=Xa \times pix(K,K+n)[mm]$$

(where, X(K+n−1)<Xa<X(K+n)) As described above, since intervals between adjacent sensor chips of the reading device 201 are not necessarily equal, it is desirable to use the above equation for a chip one chip prior to X(K+n) and the chip X(K+n).

The controller 113 uses the corrected value X'a of the main scanning position calculated in the above manner for detection of the sub-scanning position.

As described above, according to the present embodiment, the position detection accuracy is expected to be improved regardless of the mounting tolerance of the sensor chips of the reading device 201 or the expansion/contraction amount affected by the heat generation in the reading device 201.

Fourth Embodiment

Next, a fourth embodiment will be described.

The fourth embodiment is different from the first to third embodiments in that not only expansion and contraction of the reading device 201 in the main scanning direction but also warping in the height (depth) direction is considered. In the following description of the fourth embodiment, descriptions of the same component as that in the first to third embodiments will be omitted, and components different from the first to third embodiments will be described.

Figure 26:
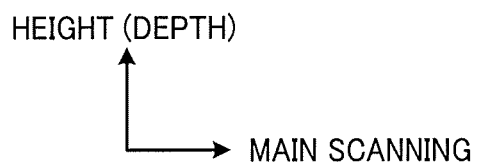
FIG. 26 is a diagram for explaining warping in the height (depth) direction due to heat generated in a reading device according to a fourth embodiment.
Figure 26:
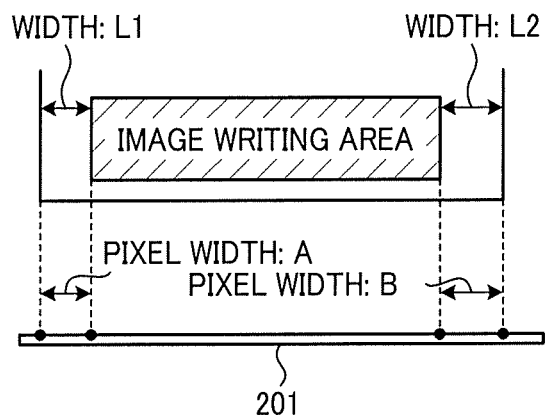
Figure 26:
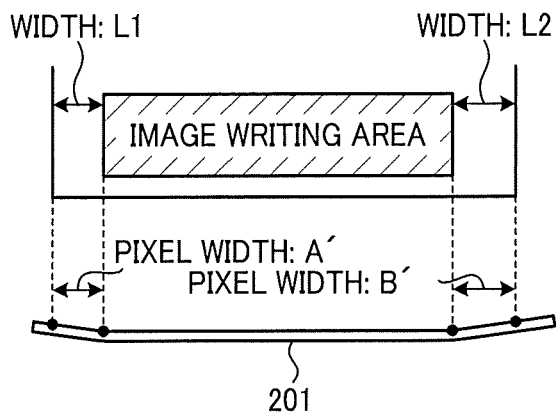

FIG. 26 is a diagram for explaining warping in the height (depth) direction due to heat generated in a reading device 201 according to the fourth embodiment. As illustrated in FIG. 26, it is generally known that there are cases where warping in the height (depth) direction occurs in the reading device 201 besides expansion and contraction in the main scanning direction due to heat generated in the reading device 201 or a rise in the ambient temperature, which may result in an error in the magnification in the main scanning direction.

For example, as illustrated in (a) of FIG. 26, in the case where there is no warping in the height (depth) direction of the reading device 201:

Pixel width corresponding to a width of L1 (unit: mm)=A (unit: dot); and

Pixel width corresponding to a width of L2 (unit: mm)=B (unit: dot). Meanwhile, as illustrated in (b) of FIG. 26, in the case where there is warping in the height (depth) direction of the reading device 201:

Pixel width corresponding to a width of L1 (unit: mm)=A' (unit: dot); and

Pixel width corresponding to a width of L2 (unit: mm)=B' (unit: dot).

Here, A≈A' and B≈B'. That is, the widths of detected pixels by the reading device 201 are different for the same physical length.

Figure 27:
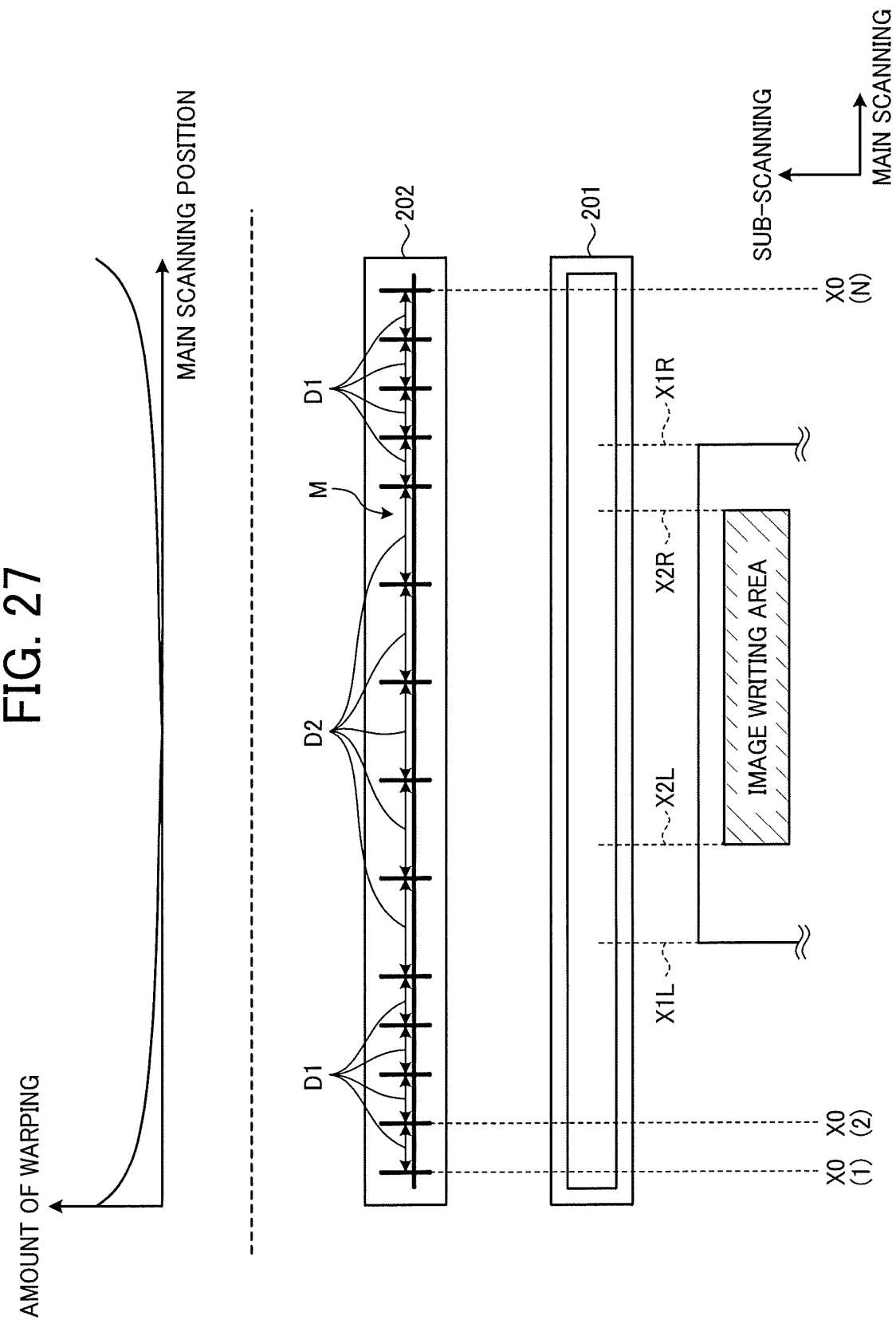
FIG. 27 is a diagram for explaining exemplary arrangement of vertical lines of a mark on a position reference member corresponding to warping in the height (depth) direction of the reading device.

FIG. 27 is a diagram for explaining exemplary arrangement of vertical lines of a mark M on a position reference member 202 corresponding to warping in the height (depth) direction of the reading device 201. As illustrated in FIG. 27, a medium position detecting device 200 of the present embodiment is arranged with vertical lines of a mark M at predetermined intervals on the position reference member 202 so as to correspond to the warping amount of the reading device 201.

More particularly, as illustrated in FIG. 27, the warping amount in the height (depth) direction of the reading device 201 abruptly increases from a predetermined position in the main scanning direction toward both ends. Therefore, in the present embodiment, the interval is allowed to be narrower in areas where the influence on the detection accuracy error due to warping is large such as that:

Both end regions in the main scanning direction with a large amount of warping: known distance D1 with relatively narrow intervals; and Center area in the main scanning direction with a small amount of warping: known distance D2 with relatively wide intervals.

By using the corrected value of the main scanning position calculated in this manner for detection of the sub-scanning position, the controller 113 can correct the inclination of the reading device 201 also for the state change of the reading device 201, thereby enabling accurate detection of the position of a recording medium.

Note that the arrangement pattern of the vertical lines of the mark M on the position reference member 202 is not limited to the contents described in this embodiment. The intervals between vertical lines of the mark M on the position reference member 202 have two types in FIG. 27; however, the intervals may be sparse and dense such that intervals of vertical lines of the mark M become gradually narrower from the both ends in the main scanning direction toward the substantially central part in the main scanning direction.

As described above, the present embodiment is capable of implementing highly accurate detection of the edge of a recording medium and an image position in consideration of only the expansion and contraction of the reading device 201 in the main scanning direction but also warping in the height (depth) direction.

Fifth Embodiment

Next, a fifth embodiment will be described.

The fifth embodiment is different from the first to fourth embodiments in that the arrangement relationship between vertical lines and a horizontal line included in a mark M is optimized. In the following description of the fifth embodiment, descriptions of the same component as that in the first to fourth embodiments will be omitted, and components different from the first to fourth embodiments will be described.

Figure 28:
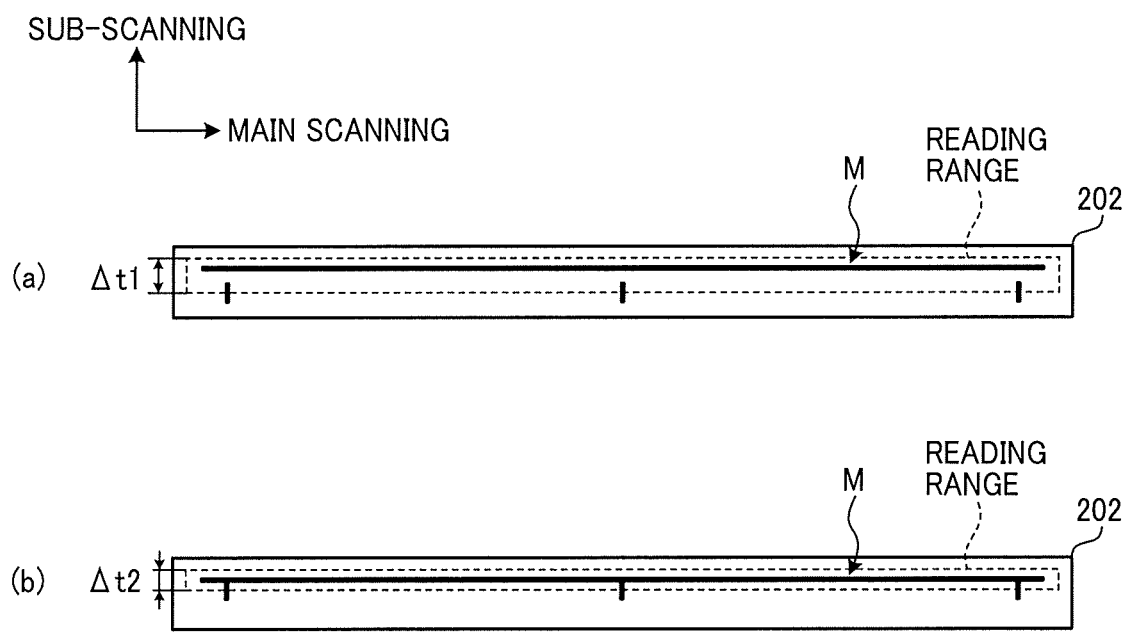
FIG. 28 is a diagram for explaining optimization of the arrangement relationship of a vertical line and horizontal lines included in marks according to a fifth embodiment.

FIG. 28 is a diagram for explaining optimization of the arrangement relationship of vertical lines and a horizontal line included in a mark M according to the fifth embodiment. As described above, a medium position detecting device 200 corrects the expansion amount of a reading device 201 by reading the vertical lines of the mark M and corrects, using the correction amount, the sub-scanning position obtained by reading the horizontal line of the mark M. Therefore, it is desirable that a time interval Δt for reading the vertical lines and the horizontal line included in the mark M is short and that no state change occurs while the lines are being read.

In order to shorten the time interval for reading the vertical lines and the horizontal line included in the mark M, it is desirable that the vertical lines and the horizontal line included in the mark M on the position reference member 202 are not separated as illustrated in (a) of FIG. 28 but are arranged so as to overlap each other at sub-scanning positions in the reading device 201 as illustrated in (b) of FIG. 28. By arranging the vertical lines and the horizontal line included in the mark M on the position reference member 202 so as to overlap each other at sub-scanning positions in the reading device 201, the reading range for reading the vertical lines and the horizontal line becomes narrow, and the time interval for reading the vertical lines and the horizontal line included in the mark M becomes shorter.

Let Δt1 be the time for reading the vertical lines and the horizontal line included in the mark M in (a) of FIG. 28, and Δt2 be the time for reading the vertical lines and the horizontal line included in the mark M in (b) of FIG. 28. Then, Δt1>Δt2 holds. Therefore, the arrangement illustrated in (b) of FIG. 28 is more advantageous with regards to the state change of the reading device 201 (detection error in the inclination becomes is smaller even with a steep temperature change). Moreover, the shorter the time interval Δt for reading the vertical lines and the horizontal line included in the mark M is, the shorter the detection time itself becomes.

Note that using an area sensor as the reading device 201 allows the vertical lines and the horizontal line included in the mark M to be read simultaneously, which results in Δt=0 with no error due to a change over time.

As described above, the present embodiment allows the vertical lines and the horizontal line included in the mark M at a relatively short time interval, and thus the inclination amount (second correction value) of the reading device 201 can be detected more accurately.

Sixth Embodiment

Next, a sixth embodiment will be described.

The sixth embodiment is different from the first to fifth embodiments in that the position of a mark M arranged on the position reference member 202 is detected for each command to start a job. In the following description of the sixth embodiment, descriptions of the same component as that in the first to fifth embodiments will be omitted, and components different from the first to fifth embodiments will be described.

FIG. 29 is a flowchart schematically illustrating a flow of processing of notifying an image writing position according to the sixth embodiment. As illustrated in FIG. 29, when power is supplied to a printing system 1 by turning on the power (step S21), a controller 113 stands by until receiving a command to start a print job from a user (No in step S22).

When receiving the command to start the print job (Yes in step S22), the controller 113 outputs a control signal to detect the position (Xf, Xr) of a mark M arranged on a position reference member 202 to a second position detector 112 (step S23).

When receiving the control signal, the second position detector 112 controls a reading device 201 to read the mark M arranged on the position reference member 202 to detect the position (Xf, Xr) of the mark M (step S24).

The second position detector 112 transmits the position (Xf, Xr) of the mark M to the controller 113 as a detection result (step S25).

The controller 113 stores the transmitted position (Xf, Xr) of the mark M in a RAM 12b or other components that is a storage (step S26).

Next, the controller 113 conveys a recording medium on which an image pattern is printed to a reading position of the reading device 201 (step S27).

Furthermore, the controller 113 outputs, to a first position detector 111, a control signal for detecting the outer shape of the conveyed recording medium and the position of the image pattern on the recording medium (step S28).

When receiving the control signal, the first position detector 111 controls the reading device 201 to read the outer shape of the conveyed recording medium and the position of the image pattern on the recording medium and determines the outer shape of the recording medium and the position of the image pattern on the recording medium (step S29). More particularly, the following positions are detected.

Head position of recording medium: X1L (unit: dot)
Tail position of recording medium: X1R (unit: dot)
Head position of image pattern: X2L (unit: dot)
Tail position of image pattern: X2R (unit: dot)

The first position detector 111 transmits the outer shape of the recording medium and the position of the image pattern on the recording medium to the controller 113 as a detection result (step S30).

Then, the controller 113 uses Xf and Xr, which correspond to X1L, X1R, X2L, and X2R, as correction parameters to calculate ΔXL and ΔXR which are edge positions of the image pattern from the edge position of the recording medium and to calculate the inclination amount of the reading device 201 (second correction value) (step S31).

The controller 113 converts the image writing positions ΔXL and ΔXR on the recording medium and the inclination amount into image writing position information and notifies a print controller 114 of the image writing position information (step S32).

As described above, according to the present embodiment, in consideration of the fact that the expansion/contraction state of the reading device 201 changes depending on the time elapsed from the start of power supply to the start of a print job, when a command to start a print job is received, the positions of the mark M on the position reference member 202 is detected before reading operation of a recording medium is started, and thereby the inclination amount (second correction value) and the expansion/contraction state of the reading device 201 are grasped to update the correction parameters. Therefore, further stabilization of detection accuracy can be expected.

Note that, in the above respective embodiments, the examples in which a position detecting device and an image forming apparatus according to embodiments of the present disclosure are applied to a printing system including an electrophotographic printing apparatus have been described; however, embodiments of the present disclosure are not limited thereto. Application may be made to a printing system including a printing apparatus of the inkjet type.

Moreover, in the above embodiments, the examples in which a position detecting device and an image forming apparatus according to embodiments of the present disclosure are applied to a printing system including a printing apparatus such as a commercial printer (production printer) have been described; however, embodiments of the present disclosure are not limited thereto. Application may be made to any image forming apparatus such as a multifunction peripheral, a copying machine, a printer, a scanner, or a facsimile that have at least two functions out of a copying function, a printer function, a scanner function, and a facsimile function.

Furthermore, in the above embodiments, the examples in which the position detecting device according to an embodiment of the present disclosure is applied to position detection in the field of image formation; however, embodiments of the present disclosure is not limited thereto and can be applied to position detection applications in various fields such as inspection in the field of FA.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A position detecting device, comprising:
    circuitry configured to
        control a reading device to detect, as a first detection result, an outer shape of a processing subject and a position of an image pattern on the processing subject;
        control the reading device to detect, as a second detection result, a mark arranged on a position reference member, the mark corresponding to a predetermined position in the reading device;
        determine a first correction value of the reading device and a second correction value of the reading device corrected by the first correction value, based on the second detection result; and
        control a print engine based on the first correction value and the second correction value so as to correct an image writing position of the processing subject.

2. The position detecting device according to claim 1, wherein the circuitry is further configured to detect the mark arranged on the position reference member each time power is supplied to the reading device.

3. The position detecting device according to claim 1, wherein the circuitry is further configured to detect the mark arranged on the position reference member each time the circuitry receives a command to start a job of detecting the outer shape of the processing subject and the position of the image pattern on the processing subject.

4. The position detecting device of claim 1, wherein the circuitry is further configured to determine an inclination amount of the reading device as the second correction value.

5. An image forming apparatus, comprising:
    the reading device;
    the position reference member on which the mark corresponding to the predetermined position in the reading device is arranged;
    a print engine; and
    the position detecting device according to claim 1, which is configured to
        control conveyance of a recording medium to the print engine, and
        control the print engine based on image writing position information notified from the position detecting device to write an image on the recording medium.

6. The position detecting device according to claim 5, wherein the mark detected by the reading device includes a reference mark forming an angle with respect to a main scanning direction of the reading device.

7. The position detecting device according to claim 5, wherein the mark detected by the reading device includes a first reference mark forming a first angle with respect to a main scanning direction of the reading device and a second reference mark forming a second angle with respect to the main scanning direction of the reading device.

8. The position detecting device according to claim 7, wherein the mark detected by the reading device includes a plurality of first reference marks including the first reference mark,
    wherein each of the plurality of first reference marks forming the first angle with respect to the main scanning direction of the reading device, and
    wherein the plurality of first reference marks is arranged at predetermined intervals on the position reference member corresponding to positions at which correction of the main scanning direction of the reading device is to be performed.

9. The position detecting device according to claim 7, wherein the second reference mark overlaps with the first reference mark in a sub-scanning direction of the reading device.

10. The position detecting device according to claim 7, wherein the first reference mark and the second reference mark are arranged on the position reference member at a plurality of areas obtained by dividing the main scanning direction of the reading device, the plurality of areas corresponding to positions at which correction of the main scanning direction of the reading device is to be performed.

11. The position detecting device according to claim 5, wherein the position reference member is installed such that regular reflection light is incident on the reading device.

12. The image forming apparatus of claim 5, wherein the reading device includes an image sensor.

13. A position detecting method to be executed in a position detecting device, the method comprising:

controlling a reading device to detect, as a first detection result, an outer shape of a processing subject and a position of an image pattern on the processing subject;

controlling the reading device to detect, as a second detection result, a mark arranged on a position reference member, the mark corresponding to a predetermined position in the reading device;

determining a first correction value of the reading device and a second correction value of the reading device corrected by the first correction value based on the second detection result; and controlling a print engine based on the first correction value and the second correction value so as to correct an image writing position of the processing subject.

14. A non-transitory recording medium storing computer-readable program code which causes a position detecting device to execute processing comprising:

controlling a reading device to detect, as a first detection result, an outer shape of a processing subject and a position of an image pattern on the processing subject;

controlling the reading device to detect, as a second detection result, a mark arranged on a position reference member, the mark corresponding to a predetermined position in the reading device;

determining a first correction value of the reading device and a second correction value of the reading device corrected by the first correction value based on the second detection result; and controlling a print engine based on the first correction value and the second correction value so as to correct an image writing position of the processing subject.

* * * * *